US011832282B2

(12) United States Patent
Houghton et al.

(10) Patent No.: US 11,832,282 B2
(45) Date of Patent: *Nov. 28, 2023

(54) SELECTIVE ADJUSTMENT OF PACKET DURATIONS

(71) Applicant: QUALCOMM Incorporated, San Diego, CA (US)

(72) Inventors: Nathaniel David Houghton, El Cerrito, CA (US); Xiaolong Huang, San Jose, CA (US); Naveen Gangadharan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,991

(22) Filed: May 24, 2022

(65) Prior Publication Data

US 2022/0369329 A1    Nov. 17, 2022

Related U.S. Application Data

(63) Continuation of application No. 16/904,380, filed on Jun. 17, 2020, now Pat. No. 11,350,431.

(Continued)

(51) Int. Cl.
*H04W 72/12* (2023.01)
*H04W 84/12* (2009.01)
(Continued)

(52) U.S. Cl.
CPC ....... *H04W 72/52* (2023.01); *H04W 72/1268* (2013.01); *H04W 72/23* (2023.01); *H04W 84/12* (2013.01)

(58) Field of Classification Search
CPC ......... H04W 72/1252; H04W 72/1268; H04W 72/1289; H04W 84/12; H04W 28/02;
(Continued)

(56) References Cited

U.S. PATENT DOCUMENTS

| 10,212,086 B2 | 2/2019 | Merlin et al. |
| 10,263,821 B2 | 4/2019 | Lee et al. |

(Continued)

FOREIGN PATENT DOCUMENTS

| EP | 3297359 A1 * | 3/2018 | ............... H04L 1/00 |
| WO | WO-2016182390 A1 * | 11/2016 | ............... H04L 1/00 |
| WO | WO-2017160470 | 9/2017 | |

OTHER PUBLICATIONS

International Search Report and Written Opinion—PCT/US2020/038384—ISA/EPO—dated Sep. 4, 2020.

*Primary Examiner* — Nathan S Taylor
(74) *Attorney, Agent, or Firm* — Holland & Hart LLP/Qualcomm

(57) ABSTRACT

This disclosure provides systems, methods and apparatus, including computer programs encoded on computer storage media, for adjusting a packet duration for triggered uplink (UL) transmissions to an access point (AP) from one or more stations (STAs). In one aspect, the AP may estimate an amount of data that a STA has queued for UL transmission and select the packet duration based on the estimated amount of queued UL data. The AP may transmit a trigger frame that solicits UL data from the STA and indicates the selected packet duration. In response, the AP may receive an UL packet from the STA and determine an amount of UL data queued in the STA based on the UL packet. In some implementations, the AP may selectively adjust the packet duration for UL transmissions based on the UL packet, the determined amount of UL data queued in the STA, or both.

21 Claims, 11 Drawing Sheets

Related U.S. Application Data

(60) Provisional application No. 62/865,038, filed on Jun. 21, 2019.

(51) Int. Cl.
  *H04W 72/52* (2023.01)
  *H04W 72/1268* (2023.01)
  *H04W 72/23* (2023.01)

(58) Field of Classification Search
  CPC . H04W 72/1284; H04W 74/04; H04W 72/12; H04W 74/00
  See application file for complete search history.

(56) References Cited

U.S. PATENT DOCUMENTS

| | | | |
|---|---|---|---|
| 10,448,426 B2* | 10/2019 | Wilhelmsson | H04W 74/0816 |
| 10,477,589 B2 | 11/2019 | Ahn et al. | |
| 2015/0139083 A1* | 5/2015 | Kneckt | H04W 74/0816 |
| | | | 370/329 |
| 2016/0127233 A1* | 5/2016 | Wentink | H04L 5/0053 |
| | | | 370/392 |
| 2016/0150467 A1 | 5/2016 | Shaw et al. | |
| 2016/0227437 A1* | 8/2016 | Blanksby | H04L 1/00 |
| 2016/0242195 A1* | 8/2016 | Kwon | H04L 27/2613 |
| 2017/0070961 A1* | 3/2017 | Bharadwaj | H04W 52/242 |
| 2017/0105217 A1* | 4/2017 | Kwon | H04W 72/082 |
| 2017/0111875 A1* | 4/2017 | Azizi | H04W 56/001 |
| 2017/0181187 A1 | 6/2017 | Asterjadhi et al. | |
| 2017/0201981 A1* | 7/2017 | Huang | H04W 74/0816 |
| 2017/0215188 A1* | 7/2017 | Kim | H04L 5/0091 |
| 2017/0273100 A1* | 9/2017 | Huang | H04W 74/08 |
| 2018/0014329 A1* | 1/2018 | Lee | H04W 74/0816 |
| 2018/0020372 A1* | 1/2018 | Viger | H04W 28/0278 |
| 2018/0020373 A1* | 1/2018 | Viger | H04W 28/0278 |
| 2018/0146426 A1* | 5/2018 | Park | H04W 52/0229 |
| 2018/0176901 A1* | 6/2018 | Huang | H04L 1/0008 |
| 2018/0213566 A1 | 7/2018 | Baron et al. | |
| 2019/0239205 A1* | 8/2019 | Ko | H04W 74/006 |
| 2020/0228634 A1* | 7/2020 | Noh | H04L 27/2613 |
| 2020/0274686 A1* | 8/2020 | Khude | H04W 74/0816 |
| 2020/0344007 A1* | 10/2020 | Chen | H04L 1/1819 |
| 2020/0374907 A1* | 11/2020 | Viger | H04W 76/14 |
| 2020/0404512 A1* | 12/2020 | Heidari | H04W 24/02 |
| 2020/0404683 A1 | 12/2020 | Houghton et al. | |

* cited by examiner

710

712

Periodically increase the selected packet duration for a time period.

Determine a weighted moving average of the estimated maximum amount of data that the STA is able to include in a given packet.

724

Select a minimum amount of data that the STA is to include in each UL packet based on the determined weighted moving average.

726

Transmit an indication of the selected minimum amount of data to the STA.

Decrease the packet duration when the amount of padding inserted into the UL packet by the STA is greater than a value while at least some UL data is queued in the STA.

Decrease the packet duration when a size or duration of one or more aggregated frames carried in the UL packet is less than a value.

Decrease the packet duration when the amount of data carried in the UL packet is less than the amount of UL data queued in the STA and at least a portion of one or more data fields contained in the UL packet do not carry queued UL data from the STA.

*Figure 8C*

SELECTIVE ADJUSTMENT OF PACKET DURATIONS

CROSS-REFERENCE TO RELATED APPLICATIONS

This patent application is a continuation of, and claims priority to, U.S. patent application Ser. No. 16/904,380 entitled "SELECTIVE ADJUSTMENT OF PACKET DURATIONS" and filed on Jun. 17, 2020, which claims priority to U.S. Provisional Patent Application No. 62/865,038 entitled "DETECTION OF PACKET AGGREGATION LIMITS" and filed on Jun. 21, 2019, all of which are assigned to the assignee hereof. The disclosures of all prior applications are considered part of and are incorporated by reference in this patent application.

TECHNICAL FIELD

This disclosure relates generally to wireless communications, and more specifically to adjusting a packet duration for uplink (UL) transmissions from one or more wireless devices.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

Some wireless networks employ multiple access mechanisms, such as an orthogonal frequency division multiple access (OFDMA) mechanism, to allow multiple STAs to transmit or receive data on a shared wireless medium at the same time. In wireless networks employing OFDMA, the available frequency spectrum may be divided into a plurality of resource units (RUs) each including a number of different frequency subcarriers, and different RUs may be allocated or assigned to different STAs at a given point in time to allow the STAs to concurrently transmit uplink (UL) data to the AP. Because each of the STAs may have different amounts of queued UL data, it would be desirable for the AP to have an accurate estimate of how much queued UL data each of the identified STAs has, for example, so that the AP may schedule UL transmissions from the identified STAs accordingly.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by an apparatus of an access point (AP), and may include selecting a packet duration for uplink (UL) transmissions from a station (STA); transmitting a trigger frame soliciting UL data from the STA and indicating the selected packet duration; receiving an UL packet of the selected packet duration from the STA; and selectively adjusting the packet duration for subsequent UL transmissions from the STA based on one or more of an amount of data carried in the UL packet, an amount of padding inserted into the UL packet by the STA, or an amount of UL data queued in the STA. In some implementations, the method also may include transmitting an indication of the adjusted packet duration to the STA. In some instances, the UL packet may be a high-efficiency (HE) trigger-based (TB) physical layer convergence procedure (PLCP) protocol data unit (PPDU). In some other instances, the UL packet may include at least one medium access control (MAC) protocol data unit (MPDU).

In some implementations, the UL packet may include an indication of the amount of UL data queued in the STA. In some instances, the indication may be carried in a Quality-of-Service (QoS) control field of the UL packet. In some other instances, the indication may be carried in one or more fields of any suitable frame or packet transmitted to the AP.

In some implementations, selectively adjusting the packet duration may include decreasing the packet duration when the amount of padding inserted into the UL packet by the STA is greater than a value while at least some UL data is queued in the STA. In some other implementations, selectively adjusting the packet duration may include decreasing the packet duration when a size or duration of one or more aggregated frames carried in the UL packet is less than a value. In some other implementations, selectively adjusting the packet duration may include decreasing the packet duration when the amount of data carried in the UL packet is less than the amount of UL data queued in the STA and at least a portion of one or more data fields contained in the UL packet do not carry queued UL data from the STA. In some other implementations, selectively adjusting the packet duration may include estimating a maximum amount of data that the STA is capable of embedding in the UL packet based at least in part on the amount of data carried in the UL packet, and adjusting the packet duration based on the estimated maximum amount of data.

In some implementations, the method also may include determining a weighted moving average of the estimated maximum amount of data that the STA is able to include in a given packet, and selecting a minimum amount of data that the STA is to include in each UL packet based on the determined weighted moving average. In some instances, the method also may include transmitting an indication of the selected minimum amount of data to the STA. In some other implementations, the method also may include periodically increasing the selected packet duration for a time period.

In some implementations, selecting the packet duration for UL transmissions may be based at least in part on estimating the amount of data that the STA has queued for UL transmissions. In some instances, the amount of UL data queued in the STA may be based at least in part on UL queue size information provided by the STA prior to transmission of the trigger frame. The UL queue size information may be contained in one or more of a buffer status report (BSR) or a Quality-of-Service (QoS) control field of a previously received UL packet from the STA.

Another innovative aspect of the subject matter described in this disclosure can be implemented in an access point (AP). In some implementations, the AP may include at least one modem, one or more processors coupled to the at least one modem, and a memory coupled to the at least one modem and the one or more processors. The memory may store instructions that, when executed by the one or more processors, cause the AP to perform a number of operations. In some implementations, the number of operations may include selecting a packet duration for uplink (UL) transmissions from a station (STA); transmitting a trigger frame soliciting UL data from the STA and indicating the selected packet duration; receiving an UL packet of the selected packet duration from the STA; and selectively adjusting the packet duration for subsequent UL transmissions from the STA based on one or more of an amount of data carried in the UL packet, an amount of padding inserted into the UL packet by the STA, or an amount of UL data queued in the STA. In some implementations, the number of operations also may include transmitting an indication of the adjusted packet duration to the STA. In some instances, the UL packet may be a high-efficiency (HE) trigger-based (TB) physical layer convergence procedure (PLCP) protocol data unit (PPDU). In some other instances, the UL packet may include at least one medium access control (MAC) protocol data unit (MPDU).

In some implementations, the UL packet may include an indication of the amount of UL data queued in the STA. In some instances, the indication may be carried in a Quality-of-Service (QoS) control field of the UL packet. In some other instances, the indication may be carried in one or more fields of any suitable frame or packet transmitted to the AP.

In some implementations, selectively adjusting the packet duration may include decreasing the packet duration when the amount of padding inserted into the UL packet by the STA is greater than a value while at least some UL data is queued in the STA. In some other implementations, selectively adjusting the packet duration may include decreasing the packet duration when a size or duration of one or more aggregated frames carried in the UL packet is less than a value. In some other implementations, selectively adjusting the packet duration may include decreasing the packet duration when the amount of data carried in the UL packet is less than the amount of UL data queued in the STA and at least a portion of one or more data fields contained in the UL packet do not carry queued UL data from the STA. In some other implementations, selectively adjusting the packet duration may include estimating a maximum amount of data that the STA is capable of embedding in the UL packet based at least in part on the amount of data carried in the UL packet, and adjusting the packet duration based on the estimated maximum amount of data.

In some implementations, the number of operations also may include determining a weighted moving average of the estimated maximum amount of data that the STA is able to include in a given packet, and selecting a minimum amount of data that the STA is to include in each UL packet based on the determined weighted moving average. In some instances, the number of operations also may include transmitting an indication of the selected minimum amount of data to the STA. In some other implementations, the number of operations also may include periodically increasing the selected packet duration for a time period.

In some implementations, selecting the packet duration for UL transmissions may be based at least in part on estimating the amount of data that the STA has queued for UL transmissions. In some instances, the amount of UL data queued in the STA may be based at least in part on UL queue size information provided by the STA prior to transmission of the trigger frame. The UL queue size information may be contained in one or more of a BSR or a QoS control field of a previously received UL packet from the STA.

Another innovative aspect of the subject matter described in this disclosure can be implemented in a non-transitory computer-readable medium. In some implementations, the non-transitory computer-readable medium stores instructions that, when executed by one or more processors of an access point (AP), cause the AP to perform operations that include selecting a packet duration for uplink (UL) transmissions from a station (STA); transmitting a trigger frame soliciting UL data from the STA and indicating the selected packet duration; receiving an UL packet of the selected packet duration from the STA; and selectively adjusting the packet duration for subsequent UL transmissions from the STA based on one or more of an amount of data carried in the UL packet, an amount of padding inserted into the UL packet by the STA, or an amount of UL data queued in the STA. In some implementations, the operations also may include transmitting an indication of the adjusted packet duration to the STA. In some instances, the UL packet may be a high-efficiency (HE) trigger-based (TB) physical layer convergence procedure (PLCP) protocol data unit (PPDU). In some other instances, the UL packet may include at least one medium access control (MAC) protocol data unit (MPDU).

In some implementations, the UL packet may include an indication of the amount of UL data queued in the STA. In some instances, the indication may be carried in a Quality-of-Service (QoS) control field of the UL packet. In some other instances, the indication may be carried in one or more fields of any suitable frame or packet transmitted to the AP.

In some implementations, selectively adjusting the packet duration may include decreasing the packet duration when the amount of padding inserted into the UL packet by the STA is greater than a value while at least some UL data is queued in the STA. In some other implementations, selectively adjusting the packet duration may include decreasing the packet duration when a size or duration of one or more aggregated frames carried in the UL packet is less than a value. In some other implementations, selectively adjusting the packet duration may include decreasing the packet duration when the amount of data carried in the UL packet is less than the amount of UL data queued in the STA and at least a portion of one or more data fields contained in the UL packet do not carry queued UL data from the STA. In some other implementations, selectively adjusting the packet duration may include estimating a maximum amount of data that the STA is capable of embedding in the UL packet based at least in part on the amount of data carried in the UL packet, and adjusting the packet duration based on the estimated maximum amount of data.

In some implementations, the operations also may include determining a weighted moving average of the estimated maximum amount of data that the STA is able to include in a given packet, and selecting a minimum amount of data that the STA is to include in each UL packet based on the determined weighted moving average. In some instances, the number of operations also may include transmitting an indication of the selected minimum amount of data to the STA. In some other implementations, the operations also may include periodically increasing the selected packet duration for a time period.

In some implementations, selecting the packet duration for UL transmissions may be based at least in part on estimating the amount of data that the STA has queued for UL transmissions. In some instances, the amount of UL data queued in the STA may be based at least in part on UL queue size information provided by the STA prior to transmission of the trigger frame. The UL queue size information may be contained in one or more of a BSR or a QoS control field of a previously received UL packet from the STA.

Another innovative aspect of the subject matter described in this disclosure can be implemented in an apparatus of an access point (AP). In some implementations, the apparatus may include means for selecting a packet duration for uplink (UL) transmissions from a station (STA); means for transmitting a trigger frame soliciting UL data from the STA and indicating the selected packet duration; means for receiving an UL packet of the selected packet duration from the STA; and means for selectively adjusting the packet duration for subsequent UL transmissions from the STA based on one or more of an amount of data carried in the UL packet, an amount of padding inserted into the UL packet by the STA, or an amount of UL data queued in the STA. In some implementations, the apparatus also may include means for transmitting an indication of the adjusted packet duration to the STA. In some instances, the UL packet may be a high-efficiency (HE) trigger-based (TB) physical layer convergence procedure (PLCP) protocol data unit (PPDU). In some other instances, the UL packet may include at least one medium access control (MAC) protocol data unit (MPDU).

In some implementations, the UL packet may include an indication of the amount of UL data queued in the STA. In some instances, the indication may be carried in a Quality-of-Service (QoS) control field of the UL packet. In some other instances, the indication may be carried in one or more fields of any suitable frame or packet transmitted to the AP.

In some implementations, the means for selectively adjusting the packet duration may be configured to decrease the packet duration when the amount of padding inserted into the UL packet by the STA is greater than a value while at least some UL data is queued in the STA. In some other implementations, the means for selectively adjusting the packet duration may be configured to decrease the packet duration when a size or duration of one or more aggregated frames carried in the UL packet is less than a value. In some other implementations, the means for selectively adjusting the packet duration may be configured to decrease the packet duration when the amount of data carried in the UL packet is less than the amount of UL data queued in the STA and at least a portion of one or more data fields contained in the UL packet do not carry queued UL data from the STA. In some other implementations, the means for selectively adjusting the packet duration may be configured to estimate a maximum amount of data that the STA is capable of embedding in the UL packet based at least in part on the amount of data carried in the UL packet, and to adjust the packet duration based on the estimated maximum amount of data.

In some implementations, the apparatus also may include means for determining a weighted moving average of the estimated maximum amount of data that the STA is able to include in a given packet, and means for selecting a minimum amount of data that the STA is to include in each UL packet based on the determined weighted moving average. In some instances, the apparatus also may include means for transmitting an indication of the selected minimum amount of data to the STA. In some other implementations, the apparatus also may include means for periodically increasing the selected packet duration for a time period.

In some implementations, selecting the packet duration for UL transmissions may be based at least in part on estimating the amount of data that the STA has queued for UL transmissions. In some instances, the amount of UL data queued in the STA may be based at least in part on UL queue size information provided by the STA prior to transmission of the trigger frame. The UL queue size information may be contained in one or more of a BSR or a QoS control field of a previously received UL packet from the STA.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7B shows an illustrative flow chart depicting another example operation for wireless communications that supports adjusting the duration of UL packets.

FIG. 7C shows an illustrative flow chart depicting another example operation for wireless communications that supports adjusting the duration of UL packets.

FIG. 8A shows an illustrative flow chart depicting another example operation for wireless communications that supports adjusting the duration of UL packets.

FIG. 8B shows an illustrative flow chart depicting another example operation for wireless communications that supports adjusting the duration of UL packets.

FIG. 8C shows an illustrative flow chart depicting another example operation for wireless communications that supports adjusting the duration of UL packets.

Like reference numbers and designations in the various drawings indicate like elements.

DETAILED DESCRIPTION

Figure 1:
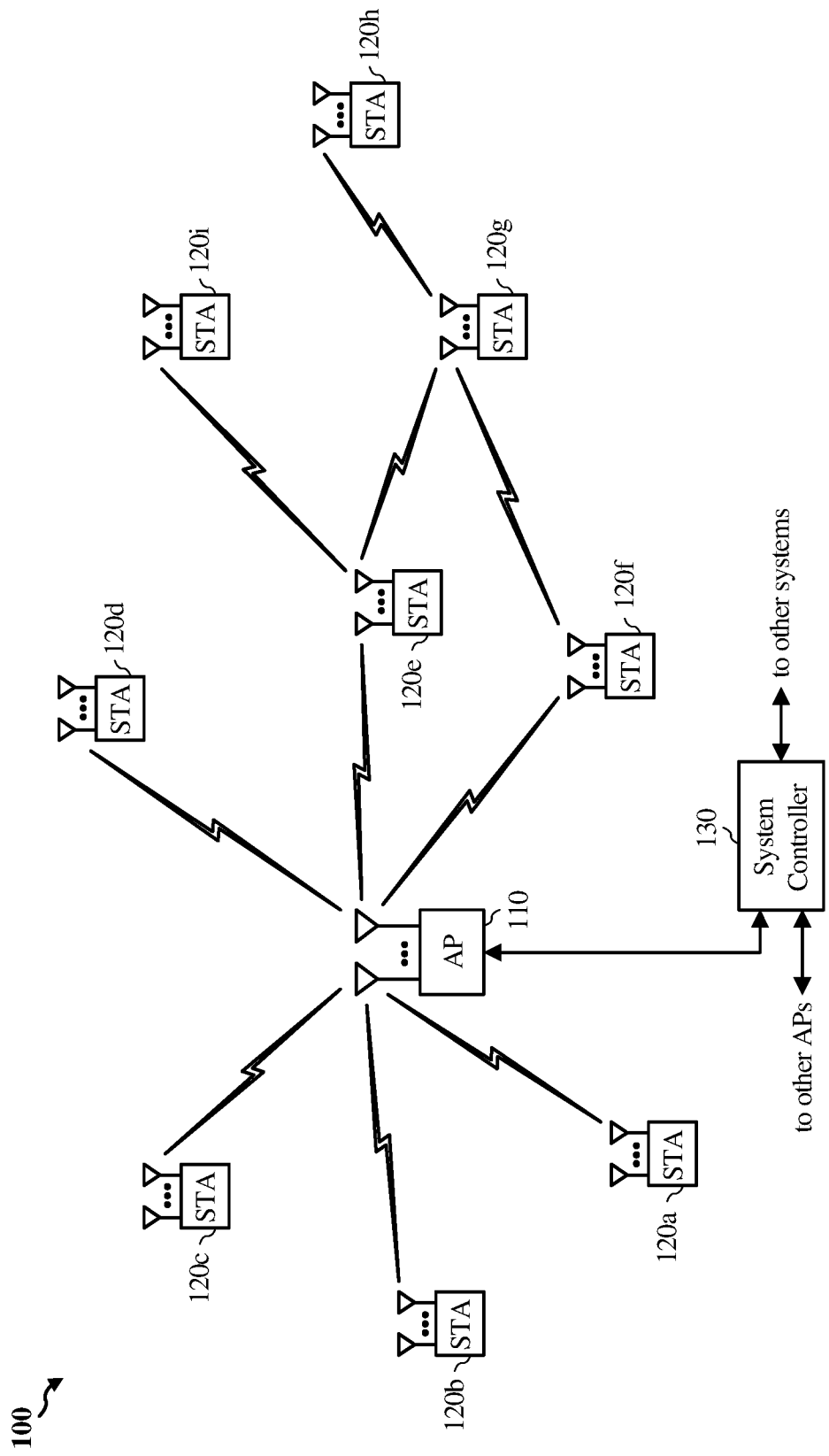
FIG. 1 shows a block diagram of an example wireless system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Implementations of the subject matter described in this disclosure may be used for selectively adjusting the length or duration of uplink (UL) packets transmitted to an access point (AP) from one or more stations (STAs, or other wireless devices). In some implementations, the AP may select the packet duration for UL transmissions based at least in part on capability information of STAs that are associated with the AP. In some instances, the capability information may indicate one or more hardware or software constraints that limit the rate at which the STA can construct one or more medium access control (MAC) protocol data units (MPDU) or fill the payloads of the MPDUs with queued UL data. In some other implementations, the AP may obtain or estimate an amount of data that a STA has queued for UL transmission, and may select the packet duration for UL transmissions based at least in part on the obtained or estimated amount of queued UL data in the STA. The AP may transmit a trigger frame that solicits UL data from the STA and that indicates the selected packet duration. The STA may receive the trigger frame, and transmit an UL packet of the selected duration to the AP. If the STA is unable to fill a payload of the UL packet with enough queued UL data to comply with the packet duration selected by the AP, the STA may insert padding (such as null data or null delimiter bytes) into the payload until the UL packet is of the length or duration selected by the AP.

The AP may receive the UL packet from the STA, and may determine one or more of an amount of data carried in the UL packet, an amount of padding inserted into the UL packet by the STA, or an amount of UL data queued in the STA. In some instances, the AP may determine the amount of UL data queued in the STA based on UL queue size information carried in the UL packet. In some implementations, the AP may selectively adjust the packet duration for subsequent UL transmissions from the STA based on one or more of the amount of data contained in the UL packet, the amount of padding inserted into the UL packet, or the amount of UL data queued in the STA.

Particular implementations of the subject matter described in this disclosure can be implemented to realize one or more of the following potential advantages. When a STA inserts padding (rather than queued UL data) into an UL packet to comply with the packet duration selected by the AP, airtime may be wasted and the wireless medium may be under-utilized. By selectively adjusting the packet duration for UL transmissions based on the amount of queued UL data that the STA is capable of embedding in UL packets, the AP may reduce or even eliminate the amount of padding inserted into UL packets by the STA to comply with the packet duration selected by the AP, thereby potentially increasing medium utilization. Also, by reducing the amount of padding inserted into a respective UL packet by the STA, the AP may trigger additional data or communications in the respective UL packet, for example, rather than waiting to trigger the additional data or communications in subsequent UL packets. Thus, by selectively adjusting the packet duration for UL transmissions based on the amount of queued UL data that the STA is capable of embedding in UL packets, the AP may increase medium utilization and reduce transmission latencies, for example, as compared with conventional techniques that do not adjust the length or duration of UL packets.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium. The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique MAC address that is programmed therein by, for example, the manufacturer of the access point. Similarly, each of the STAs 120a-120i also may be assigned a unique MAC address.

In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, a system controller 130 may facilitate communications between the AP 110 and other networks or systems. In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 may periodically broadcast beacon frames to enable the STAs 120a-120i and other wireless devices within wireless range of the AP 110 to establish and maintain a communication link with the AP 110. The bacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The broadcasted beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, each of the stations STAs 120a-120i and the AP 110 may include one or more transceivers, one or more processing resources (such as processors or Application-Specific Integrated Circuits (ASICs)), one or more memory resources, and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 4A, 4B, 6, 7A, 7B, 7C, 8A, 8B, 8C, 8D, 8E, and 9.

Figure 2:
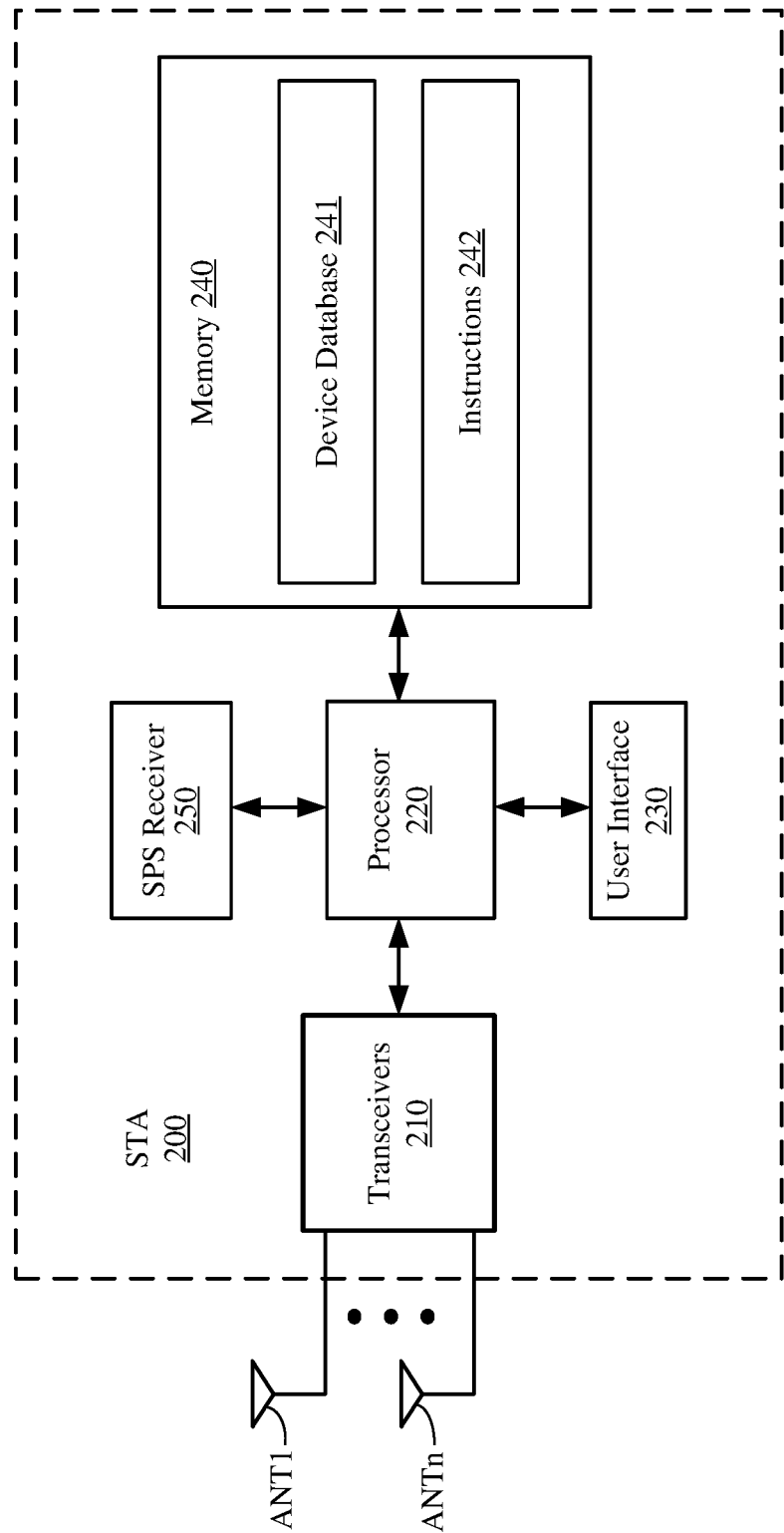
FIG. 2 shows a block diagram of an example wireless station (STA).

FIG. 2 shows an example wireless station (STA) 200. The STA 200 may be one implementation of at least one of the STAs 120a-120i of FIG. 1. The STA 200 may include one or more transceivers 210, a processor 220, a user interface 230, a memory 240, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from other wireless devices including, for example, a number of APs and a number of other STAs. Although not shown in FIG. 2 for simplicity, the transceivers 210 may include any number of transmit chains to process and transmit signals to other wireless devices via antennas ANT1-ANTn, and may include any number of receive chains to process signals received from antennas ANT1-ANTn. Thus, the STA 200 may be configured for MIMO communications and OFDMA communications. The MIMO communications may include SU-MIMO communications and MU-MIMO communications. In some implementations, the STA 200 may use multiple antennas ANT1-ANTn to provide antenna diversity. Antenna diversity may include polarization diversity, pattern diversity, and spatial diversity.

The processor 220 may be any suitable one or more processors capable of executing scripts or instructions of one or more software programs stored in the STA 200 (such as within the memory 240). In some implementations, the processor 220 may be or include one or more microprocessors providing the processor functionality and external memory providing at least a portion of machine-readable media. In other implementations, the processor 220 may be or include an Application Specific Integrated Circuit (ASIC) with the processor, the bus interface, the user interface, and at least a portion of the machine-readable media integrated into a single chip. In some other implementations, the processor 220 may be or include one or more Field Programmable Gate Arrays (FPGAs) or Programmable Logic Devices (PLDs).

The user interface 230, which is coupled to the processor 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the STA 200 may include a satellite positioning system (SPS) receiver 250. The SPS receiver 250, which is coupled to the processor 220, may be used to acquire and receive signals transmitted from one or more satellites or satellite systems via an antenna (not shown for simplicity). Signals received by the SPS receiver 250 may be used to determine (or at least assist with the determination of) a location of the STA 200.

The memory 240 may include a device database 241 that may store location data, configuration information, data rates, a medium access control (MAC) address, timing information, modulation and coding schemes (MCSs), traffic indication (TID) queue sizes, ranging capabilities, and other suitable information about (or pertaining to) the STA 200. The device database 241 also may store profile information for a number of other wireless devices. The profile information for a given wireless device may include, for example, a service set identification (SSID) for the wireless device, a Basic Service Set Identifier (BSSID), operating channels, TSF values, beacon intervals, ranging schedules, channel state information (CSI), received signal strength indicator (RSSI) values, goodput values, and connection history with the STA 200. In some implementations, the profile information for a given wireless device also may include clock offset values, carrier frequency offset values, and ranging capabilities.

The memory 240 also may be or include a non-transitory computer-readable storage medium (such as one or more nonvolatile memory elements, such as EPROM, EEPROM, Flash memory, a hard drive, and so on) that may store computer-executable instructions 242 to perform all or a portion of one or more operations described in this disclosure.

Figure 3:
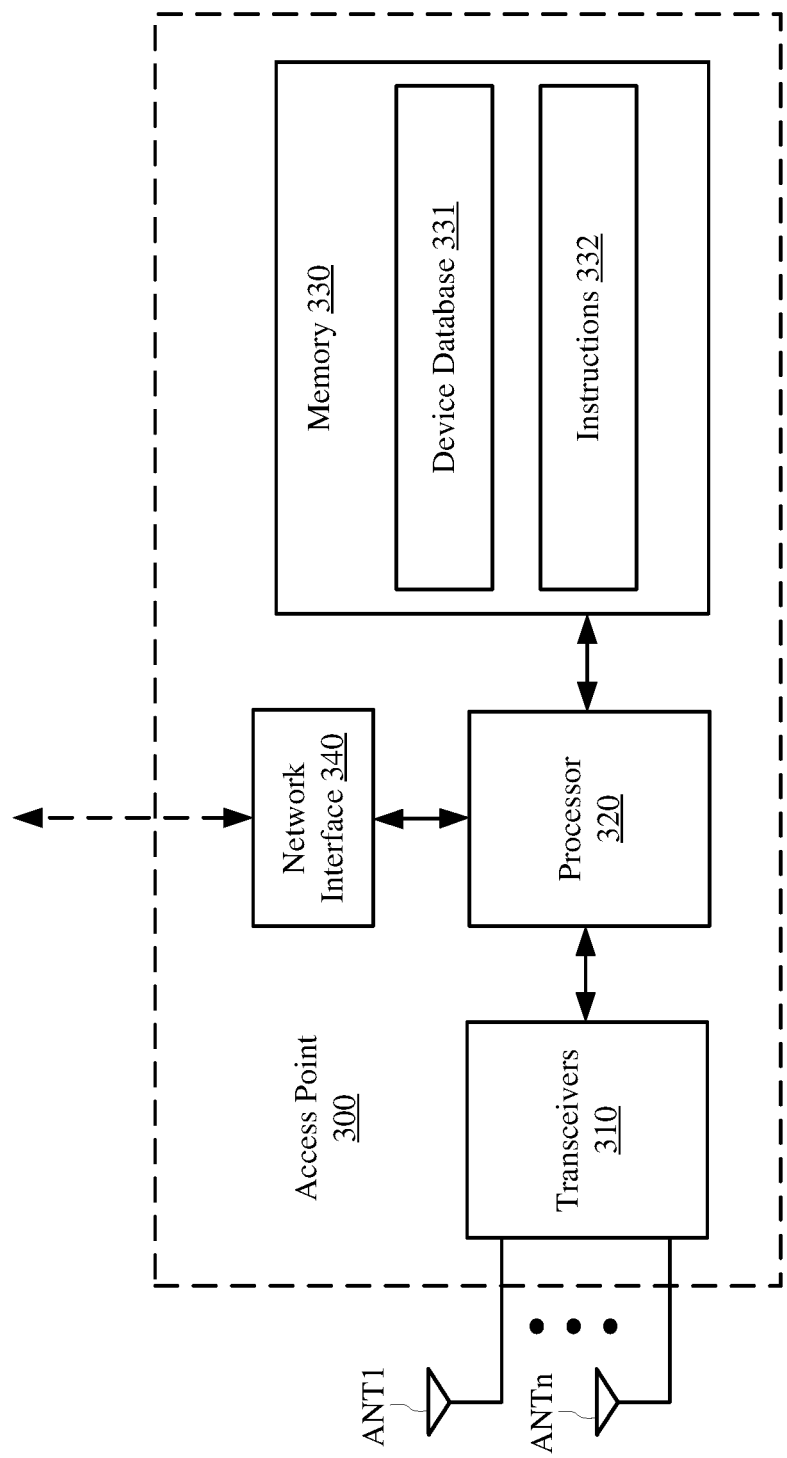
FIG. 3 shows a block diagram of an example access point (AP).

FIG. 3 shows an example access point (AP) 300. The AP 300 may be one implementation of the AP 110 of FIG. 1. The AP 300 may include one or more transceivers 310, a processor 320, a memory 330, a network interface 340, and a number of antennas ANT1-ANTn. The transceivers 310 may be coupled to the antennas ANT1-ANTn, either directly or through an antenna selection circuit (not shown for simplicity). The transceivers 310 may be used to transmit signals to and receive signals from other wireless devices including, for example, one or more of the STAs 120a-120i of FIG. 1 and other APs. Although not shown in FIG. 3 for simplicity, the transceivers 310 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity.

Antenna diversity may include polarization diversity, pattern diversity, and spatial diversity.

The network interface 340, which is coupled to the processor 320, may be used to communicate with the system controller 130 of FIG. 1. The network interface 340 also may allow the AP 300 to communicate, either directly or via one or more intervening networks, with other wireless systems, with other APs, with one or more back-haul networks, or any combination thereof.

The memory 330 may include a device database 331 that may store location data, configuration information, data rates, the MAC address, timing information, MCSs, ranging capabilities, and other suitable information about (or pertaining to) the AP 300. The device database 331 also may store profile information for a number of other wireless devices (such as one or more of the stations 120a-120i of FIG. 1). The profile information for a given wireless device may include, for example, an SSID for the wireless device, a BSSID, operating channels, CSI, received signal strength indicator (RSSI) values, goodput values, and connection history with the AP 300. In some implementations, the profile information for a given wireless device also may include TID queue sizes, a preferred packet duration for trigger-based UL transmissions, and a maximum amount of queued UL data that the wireless device is able to insert into TB PPBUs.

The memory 330 also may be or include a non-transitory computer-readable storage medium (such as one or more nonvolatile memory elements, such as EPROM, EEPROM, Flash memory, a hard drive, and so on) that may store computer-executable instructions 332 to perform all or a portion of one or more operations described in this disclosure.

Figure 4A:
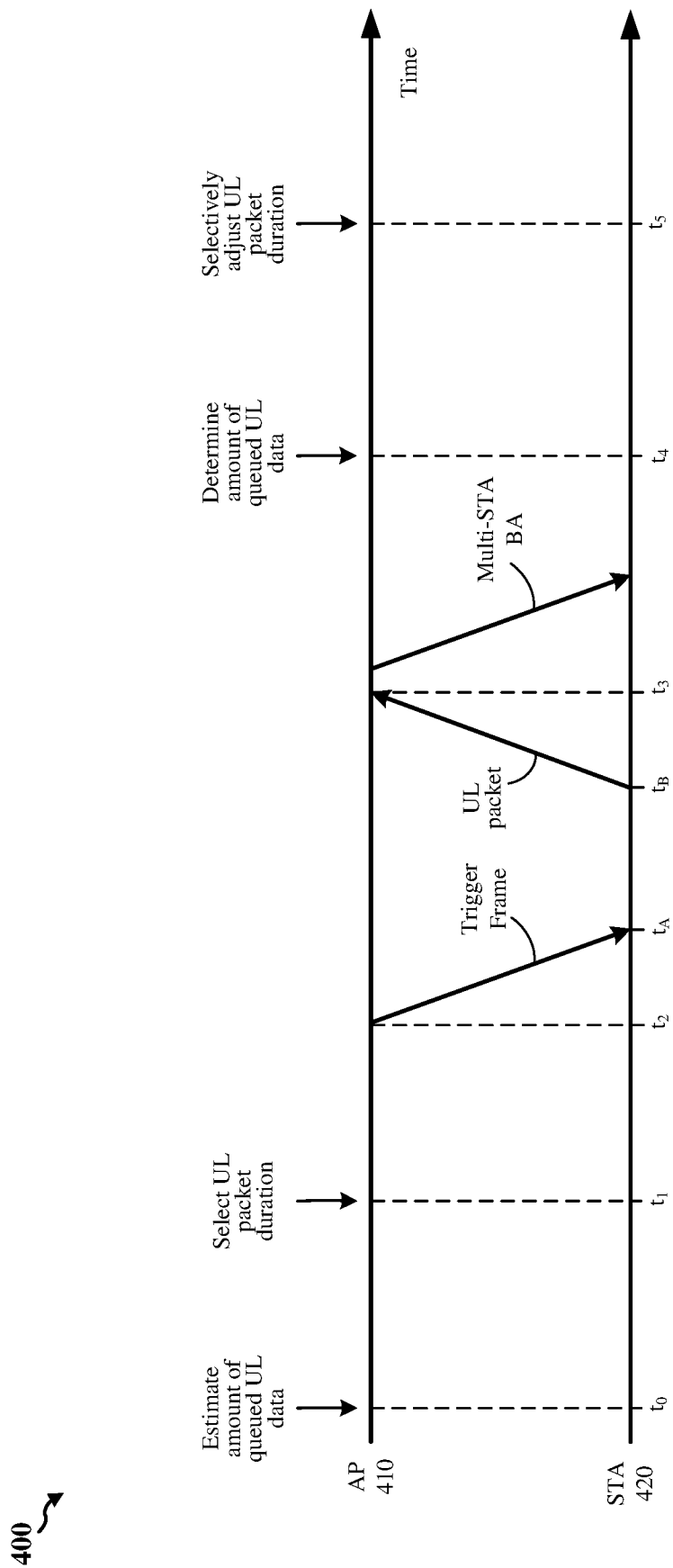
FIG. 4A shows a timing diagram illustrating an example operation for wireless communication.

FIG. 4A shows a timing diagram 400 depicting an example operation 400 for adjusting a packet duration for triggered uplink (UL) transmissions from one or more STAs 420 to an AP 410. The AP 410 may be any suitable AP including, for example, the AP 110 of FIG. 1 or the AP 300 of FIG. 3. Each of the one or more STAs 420 may be any suitable wireless station including, for example, the stations 120a-120i of FIG. 1 or the STA 200 of FIG. 2. Although only one STA 420 is shown in FIG. 4A for simplicity, the example operation 400 of FIG. 4A may be performed with any suitable number of STAs. As such, any reference herein to more than one STA 420 may refer to the STA 420 of FIG. 4A and to one or more other STAs (not shown for simplicity) that are triggered for UL transmissions by the AP 410. In some implementations, the AP 410 may operate or control a BSS, and the one or more STAs 420 may be associated with the AP 410 and belong to the BSS.

At or before time to, the AP 410 may estimate an amount of data (such as in bytes) that the STA 420 has queued (or "buffered") for UL transmission to the AP 410. As used herein, the estimated amount of queued UL data also may be referred to as an "uplink (UL) queue depth estimate" or an "UL traffic identifier (TID) queue depth estimate." In some implementations, the AP 410 may estimate the amount of queued UL data in the STA 420 based on information contained in a quality of service (QoS) control ("queue size") field of one or more UL packets previously received from the STA 420. In some other implementations, the AP 410 may estimate the amount of queued UL data at the STA 420 based on a Buffer Status Report provided by the STA 420 in response to a Buffer Status Report Poll (BSRP) transmitted by the AP 410 to the STA 420.

At or before time $t_1$, the AP 410 may select a packet duration for UL transmissions from the STA 420 (and for other STAs triggered for UL transmissions to the AP 410). In some implementations, the AP 410 may select the packet duration based on the estimated amount of queued UL data at the STA 420, an estimated sustainable PHY rate of the STA 420, or both. Techniques for estimating the sustainable PHY rate of a wireless communication device such as a STA are well-known in the art, and therefore not repeated herein. Selecting the UL packet duration based on the estimated amount of queued UL data at the STA 420 may increase the likelihood that the STA is able to fill the payloads of one or more packets with similar amounts of queued UL data. As a non-limiting example, if the estimated amount of UL data at the STA 420 is equivalent to a packet length of more than of 4 milliseconds (ms), the AP 410 may select a UL packet duration of 4 ms, for example, to increase the likelihood that the STA is able to fill the packet payload with queued UL data. As another non-limiting example, if the estimated amount of UL data at the STA 420 is equivalent to a packet length of 14 ms (or a hundred or so microseconds less), the AP 410 may select a UL packet duration of approximately 3.5 ms, for example, so that the STA 420 can fill the payloads of four UL packets with its queued UL data, evenly. For UL data to be transmitted using MU-MIMO communications, the AP 410 may select a number of spatial streams (NSS) to be used by each STA 420 triggered for UL transmissions to the AP 410. For UL data to be transmitted using OFDMA communications, the AP 410 may allocate one or more unique resource units (RUs) to each STA 420 that is triggered for UL transmissions to the AP 410.

Selecting the UL packet duration based on the estimated sustainable PHY rate of the STA 420 may increase the likelihood that the STA can insert queued UL data into the payloads of UL packets (and transmit the UL packets) with sufficient speed to meet the selected UL packet duration. As a non-limiting example, if the estimated sustainable PHY rate of the STA 420 is insufficient for the STA 420 to construct and embed MPDUs carrying a certain amount (or more) of queued UL data into an UL PPDU of the selected duration, the AP 410 may decrease the UL packet duration. The STA 420 may be more likely to fill the payloads of subsequent UL packets with queued UL data, rather than padding, which may improve throughput and efficiency metrics of a wireless medium or wireless network.

At time t2, the AP 410 may transmit a trigger frame soliciting UL data from one or more of the STAs 420. The trigger frame may identify the one or more STAs 420 for UL transmissions, may indicate the selected packet duration, may indicate the MCS to be used by the identified STAs 420, may indicate the number of spatial streams to be used by the identified STAs 420, and may allocate one or more unique RUs to each of the identified STAs 420. In some implementations, the trigger frame may be a high-efficiency (HE) trigger-based (TB) physical layer convergence procedure (PLCP) protocol data unit (PPDU). In some other implementations, the trigger frame may be an extremely high throughput (EHT) PPDU.

At time $t_A$, the STA receives the trigger frame and decodes the information contained therein. At time $t_B$, the STA transmits an UL packet to the AP 410 using the one or more RUs allocated by the AP 410. In some implementations, the UL packet may be a HE TB PPDU containing a number of data frames such as medium access control (MAC) protocol data units (MPDUs). In some other implementations, the UL packet may be an EHT TB PPDU containing a number of data frames such as MPDUs. Each of the MPDUs may include a MAC header containing a QoS Control field, and may include a payload containing at least a portion of the UL data queued in the STA. The QoS Control field may indicate an updated UL queue size for the STA. In some implementations, the STA may aggregate each of the MPDUs into a single aggregated MPDU (A-MPDU) contained in the UL packet (such as a HE TB PPDU or an EHT TB PPDU).

In some implementations, the AP 410 and the STA may negotiate a MPDU window size for each TID, for example, during establishment of a block acknowledgement (BA) policy between the AP 410 and the STA. For example, the negotiated MPDU window size may be 32 MPDUs, 64 MPDUs, 128 MPDUs, or any other suitable number of MPDUs. For purposes of discussion herein, the negotiated MPDU window size may be referred to as a "TID MPDU aggregation limit" or an "aggregation limit."

In some implementations, the STA may not be able to insert enough of its queued UL data into the UL packet to meet the packet duration selected by the AP 410, and may insert padding (rather than UL data) into one or more of the MPDUs so that the resulting UL packet is of the duration selected by the AP 410. For example, due to hardware or software constraints, the STA may not be able to construct MPDUs at a rate sufficient to completely fill the payloads of the MPDUs with its queued UL data. In addition, or in the alternative, the STA may construct the UL packet with smaller-than-expected MPDUs (such as with MPDUs having a duration less than the negotiated TID MPDU window size). For example, the STA may aggregate a number of MPDUs of a particular length corresponding to the negotiated TID MPDU aggregation limit and, once the STA reaches the aggregation limit, the STA may insert padding into the remaining or unused portions of the payload of one or more MPDUs, for example, so that the resulting UL packet is of the duration indicated in the trigger frame.

At time $t_3$, the AP 410 may receive the UL packet (such as a HE TB PPDU or an EHT TB PPDU) from the STA. For the example of FIG. 4A, the UL packet may contain padding, even though the STA has enough queued UL data to fill the entire UL packet. As such, the amount of UL data contained in the UL packet may be less than the TID queue size reported by the STA (such as in a Buffer Status Report), less than the amount of queued UL data estimated by the AP 410, or both. Just after time $t_3$, the AP 410 may transmit a multi-STA block acknowledgement ("multi-STA BA") frame to acknowledge reception of the UL packets.

At time $t_4$, the AP 410 may determine the amount of data contained in the UL packet, the amount of padding contained in the UL packet, the number of aggregated frames contained in the UL packet, and the amount of UL data queued in the STA. In some implementations, the AP 410 may determine the amount of UL data queued in the STA based on information contained in the received UL packet (such as the queue size indicated in the QoS control field of the UL packet).

At time $t_5$, the AP 410 may adjust the packet duration for UL transmissions based on one or more of the amount of data contained in the UL packet, the amount of padding contained in the UL packet, the number of aggregated frames contained in the UL packet, or the determined amount of UL data queued in the STA. In some implementations, the AP 410 also may consider one or more of an average frame length, the number of triggered STAs, or an estimated sustainable PHY rate of each of the triggered STAs when adjusting the packet duration for UL transmissions.

The AP 410 may determine (on a per-STA basis) one or more parameters for determining whether a particular STA is underserving the AP's selected UL resource assignment (such as the number of spatial streams (NSS) for UL MU-MIMO transmissions or an RU allocation for UL OFDMA transmissions). In some implementations, the AP 410 may determine one or more of the number of data bytes in the UL packet (denoted as "PPDU_RX_DATA_BYTES_STA$_i$"), the number of MPDUs (denoted as "PPDU_NUM_RX_DATA_MPDU_STA$_i$"), or the average MPDU length (denoted as PPDU_AVG_MPDU_LEN_STA$_i$).

The AP 410 may calculate the average received MPDU length according to the following equation:

$$\text{Average received } MPDU \text{ length} = \frac{\text{Number of received data bytes}}{\text{Number of received data } MPDUs}$$

The AP 410 also may determine an estimated queue size (or depth) in bytes (denoted as "PPDU_QS_BYTES_STA$_i$"). As discussed, the STA 420 may indicate its queue size in the QoS control field of the UL packet. The AP 410 also may determine a number of received null delimiter bytes in the UL packet (denoted as "PPDU_RX_NULL_DELIM_BYTES_STA$_i$"), which may indicate the amount of padding contained in the UL packet.

The AP 410 may use the aforementioned parameters to determine whether the STA is underserving the AP 410 for a given UL packet. For example, the AP 410 may determine that the STA is underserving the AP 410 if an amount of data contained in the UL packet is less than the determined amount of UL data queued in the STA prior to the transmission of the UL packet, if an amount of padding contained in the UL packet is greater than an average length of the number of aggregated data frames contained in the UL packet by a first value (such as a first threshold value selected or configured by the AP 410), if the determined amount of UL data queued in the STA prior to the transmission of the UL packet is greater than the average frame length of the UL packet by at least a second value (such as a second threshold value selected or configured by the AP 410), or any combination thereof. In some implementations, the AP 410 may determine that the STA is underserving the AP 410 for an UL packet if one or more of the following Conditions 1-3 are true for the UL packet:

(1) Number of received data bytes<Estimated queue size;
(2) Number of received null delimiter bytes≥C1*Average received MPDU length; and
(3) Estimated queue size−Number of received data bytes≥C2*Average received MPDU length, where C1 and C2 are constants and may be equal to 1.

In some implementations, the AP 410 may adjust the constants C1 or C2 according to a desired sensitivity to false positives when the AP 410 is identifying underserving STAs. As a non-limiting example, Condition 2 may be true when the UL packet contains enough padding to have fit at least one additional MPDU having the average received MPDU length into the UL packet payload, and Condition 3 may be true when a difference between the estimated queue size and the amount of data received in the UL packet is greater than a certain multiple of the average received MPDU length. The AP 410 may determine whether one or more of Conditions 1-3 are true during reception of the UL packet, after reception of the UL packet, or both.

In response to determining that the STA is underserving the AP 410, the AP 410 may estimate a maximum amount of data that the STA is able to include in a subsequent UL packet based on the amount of data contained in the current UL packet. In some implementations, the AP 410 may, in response to determining that a STA is underserving the AP 410, decrease the selected packet duration (such as to increase the likelihood that the STA is able to fill the payloads of UL packets). For purposes of discussion herein, the estimated maximum amount of data for a STA may be referred to as "Estimated_Max_PPDU_Bytes_STA$_i$" or "estimated potential upper bound." In some implementations, the AP 410 may set the estimated potential upper bound to the number of received data bytes, and may set a weighted moving average for the estimated potential upper bound equal to:

$$\alpha * \text{Estimated\_Max\_PPDU\_Bytes\_STA\_}i_{prev} + (1-\alpha) * \text{Number of received data bytes},$$

where Estimated_Max_PPDU_Bytes_STA_$i_{prev}$ represents a previous iteration of the moving average for the estimated potential upper bound, and a is an adjustable value (such as ⅞).

In some implementations, the AP 410 may, in response to determining that the STA is not underserving the AP 410, set the weighted moving average for the estimated potential upper bound equal to:

$$\alpha * \text{Estimated\_Max\_PPDU\_Bytes\_STA}_i\_prev + (1-\alpha) * \text{Temp}_i,$$

where Temp$_i$ is equal to the higher of Estimated_Max_PPDU_Bytes_STA$_i$_prev and Number of received data bytes.

In addition, or in the alternative, the AP 410 may select a minimum amount of data that the STA is to include in each UL packet. For example, the AP 410 may set a minimum value of the weighted moving average for the estimated potential upper bound, such as to an adjustable minimum byte value (64*1500 bytes=96,000 minimum) that the STA may be expected to support. In this manner, the AP 410 may increase a sensitivity to false detections of underserving STAs due to an incorrect Queue Size report from the STA.

The AP 410 also may update the estimated potential upper bound if the AP 410 determines that a total number of bytes contained in a given UL packet is higher than the estimated potential upper bound. For example, the AP 410 may set the estimated potential upper bound to the total number of contained bytes, rather than calculating the corresponding iteration for the weighted average of the estimated potential upper bound.

In addition, or in the alternative, the AP 410 may periodically increase the estimated potential upper bound to account for instances where the UL performance for the STA improves over time (such as when transitioning out of a power-saving mode) as well as to decrease false detections of underserving STAs. For example, for every N trigger frames that the AP 410 transmits, the AP 410 may increase the estimated potential upper bound by a multiple of the average MPDU size (in bytes) for the UL packets already received at the AP 410. As a non-limiting example, N may be equal to 10. In addition, or in the alternative, the AP 410 may periodically increase the selected packet duration for a time period.

In some implementations, the AP 410 may repeat one or more of the above determinations for one or more additional UL packets (not shown in FIG. 4A for simplicity) and track the results over time. In this manner, the AP 410 may augment (or "refine," "enhance," or "modify") the queue depth that the STA reported in the UL packet (from time t$_3$) based on the STA's historical UL performance discussed above. For purposes of discussion herein, the reported queue depth (in bytes) may be referred to as "Reported_Queue_Size_Bytes_STA$_i$" or "reported queue depth."

In some implementations, the AP 410 may determine an expected number of response bytes that the STA will include in an upcoming UL packet based on the above determinations. The expected number of response bytes may be referred to herein as "Expected_PPDU_Response_Bytes_STA$_i$." For example, the AP 410 may set the expected number of response bytes equal to the lower of the estimated potential upper bound and the reported queue depth.

In addition, or in the alternative, the AP 410 may periodically probe the STA and set the expected number of response bytes equal to the lower of:

$$C3 * \text{Average\_PPDU\_MPDU\_SIZE\_STA}_i + \text{Estimated potential upper bound; and Reported\_Queue\_Size\_Bytes\_STA}\_i,$$

where C3 is a tunable value representing a number of additional MPDUs that the AP 410 determines to allocate for the STA in the UL packet, Average_PPDU_MPDU_SIZE_STA$_i$ represents an average length (in bytes) for some number of recently received MPDUs in UL packets from STA$_i$, and Reported_Queue_Size_Bytes_STA$_i$ represents a most recent queue size estimate received from the STA, such as in the QoS Control field, a Buffer Status Report (BSR), or any other suitable method of delivery. In this manner, the AP 410 may refine the estimate of the expected maximum number of bytes that the STA may deliver to the AP 410 in an upcoming UL packet, adjusted for unexpected padding due to possibly unknown limitations of the STA. After time t$_5$, the AP 410 may transmit a subsequent adjusted trigger frame (not shown in FIG. 4A for simplicity) that indicates the updated estimated potential upper bound.

In some implementations, the subsequent trigger frame may further contain an indication of the selected maximum amount of data mentioned above, the selected minimum amount of data mentioned above, or both. In some aspects, the subsequent trigger frame also may indicate additional parameters for UL transmissions, such as an estimated Modulation and Coding Scheme (MCS), a selection between a UL-MU-MIMO mode and a UL-OFDMA mode, an UL packet duration, a set of STAs, a NSS, a frequency domain resource unit (RU) allocation, among other parameters.

Figure 4B:
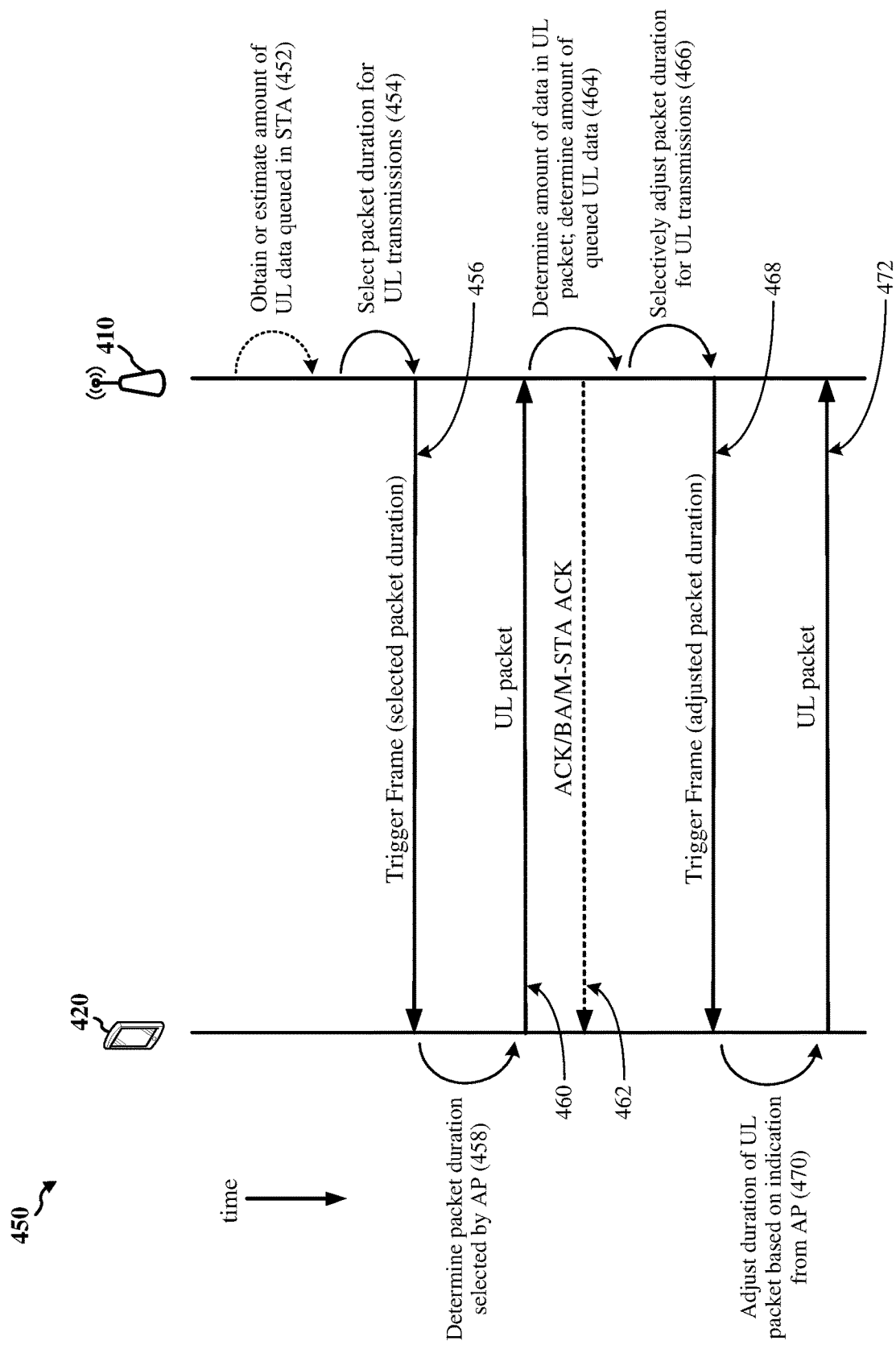
FIG. 4B shows a timing diagram illustrating another example operation for wireless communication.

FIG. 4B shows a timing diagram illustrating another example operation 450 for wireless communication. The operation 450 is depicted between an AP 410 and a STA 420. The AP 410 may be any suitable AP including, for example, the AP 110 of FIG. 1 or the AP 300 of FIG. 3. Each of the STAs may be any suitable wireless station including, for example, the stations 120*a*-120*i* of FIG. 1 or the STA 200 of FIG. 2. Although only one STA 420 is shown in FIG. 4 for simplicity, the example operation of FIG. 4 may be performed with any suitable number of STAs. In some implementations, the AP 410 may operate or control a BSS, and the one or more STAs may be associated with the AP 410 and belong to the BSS.

In some implementations, the AP 410 may obtain or estimate the amount of UL data queued in the STA 420 (452). In some instances, the AP 410 may receive UL queue size information in one or more previously received UL packets from the STA 420. In some other instances, the AP 410 may receive UL queue size information in one or more BSRs provided by the STA 420. In some other implementations, the AP 410 may not obtain or estimate the amount of UL data queued in the STA 420 prior to selecting the packet duration for UL transmissions from the STA 420. For example, an AP operating in a wireless network that utilizes multi-user orthogonal frequency division multiple access (MU-OFDMA) techniques for UL transmissions may not need, or may not consider, the UL queue size of STA 420 (or the UL queue sizes of other triggered STAs) when selecting the duration of UL packets.

The AP 410 may select a packet duration for UL transmissions from STAs associated with the AP 410 (454). In some instances, the AP 410 may select the packet duration based on the obtained amount of queued UL data in the STA 420, on the estimated amount of queued UL data in the STA 420, on an estimated sustainable PHY rate of the STA 420, or on any other suitable parameter or metric from which the amount of data that the STA 420 is capable of embedding in an UL packet can be determined or derived.

The AP 410 may transmit a trigger frame that solicits UL data from one or more STAs, and that indicates the packet duration selected by the AP 410 (456). The trigger frame also may identify the one or more STAs for UL transmissions, may indicate the MCS to be used by the one or more identified STAs, may indicate the number of spatial streams to be used by the one or more identified STAs, and may allocate RUs to the one or more identified STAs for UL transmissions.

The STA 420 receives the trigger frame, decodes the information contained therein, and determines the packet duration selected by the AP 410 (458). The STA 420 transmits an UL packet of the selected packet duration to the AP 410 (460). In some implementations, the UL packet may be a HE TB PPDU containing one or more data frames such as medium access control (MAC) protocol data units (MPDUs). In some other implementations, the UL packet may be an EHT TB PPDU containing one or more data frames such as MPDUs. Each of the MPDUs may include a MAC header containing a QoS Control field, and may include a payload containing at least a portion of the UL data queued in the STA 420. The QoS Control field may indicate an updated UL queue size for the STA 420. In some implementations, the STA 420 may aggregate each of the MPDUs into a single aggregated MPDU (A-MPDU) contained in the UL packet.

If the STA 420 is not able to insert enough of its queued UL data into the UL packet to meet the packet duration selected by the AP 410, the STA 420 may insert padding (rather than UL data) into one or more of the MPDUs until the resulting UL packet is of the duration selected by the AP 410. For example, due to hardware or software constraints, the STA 420 may not be able to construct MPDUs quickly enough to completely fill the payloads of the MPDUs with queued UL data. In addition, or in the alternative, the STA 420 may construct the UL packet with smaller-than-expected MPDUs (such as with MPDUs having a duration less than the negotiated TID MPDU window size). For example, the STA 420 may aggregate a number of MPDUs of a particular length corresponding to the negotiated TID MPDU aggregation limit and, once the STA 420 reaches the aggregation limit, the STA 420 may insert padding into the remaining or unused portions of the payload of one or more MPDUs, for example, so that the resulting UL packet is of the duration indicated in the trigger frame.

The AP 410 may receive the UL packet (such as an HE TB PPDU or an EHT TB PPDU) from the STA 420. For the example of FIG. 4B, the UL packet may contain padding, even though the STA 420 has enough queued UL data to fill the entire UL packet. As such, the amount of UL data contained in the UL packet may be less than the TID queue size reported by the STA 420, less than the amount of queued UL data estimated by the AP 410, or both. The AP 410 may acknowledge reception of the UL packet from the STA 420 using ACK, frames, BA frames, M-STA BA frames, or any other suitable message (462).

The AP 410 may determine the amount of data contained in the UL packet, the amount of padding contained in the UL packet, the number of aggregated frames contained in the UL packet, and the amount of UL data queued in the STA 420 (464). In some implementations, the AP 410 may determine the amount of UL data queued in the STA 420 based on information contained in the received UL packet (such as the queue size indicated in the QoS control field of the UL packet).

The AP 410 may selectively adjust the packet duration for subsequent UL transmissions based on one or more of the amount of data contained in the UL packet, the amount of padding inserted into the UL packet by the STA, the number of aggregated frames contained in the UL packet, or the determined amount of UL data queued in the STA 420 (466). In some implementations, the AP 410 also may consider one or more of an average frame length, the number of triggered STAs, or an estimated sustainable PHY rate of each of the triggered STAs when adjusting the packet duration for UL transmissions.

In some implementations, the AP may transmit a second trigger frame that solicits UL data from one or more STAs, and that indicates the adjusted packet duration (468). The second trigger frame also may identify the one or more STAs for UL transmissions, may indicate the MCS to be used by the one or more identified STAs, may indicate the number of spatial streams to be used by the one or more identified STAs, and may allocate RUs to the one or more identified STAs for UL transmissions.

In some implementations, the STA 420 receives the second trigger frame, decodes the information contained therein, and determines the adjusted packet duration indicated by the AP 410 (470). The STA 420 transmits an UL packet of the adjusted packet duration to the AP 410 based on receiving the second trigger frame (472). In some implementations, the UL packet may be a HE TB PPDU containing one or more data frames such as MPDUs. In some other implementations, the UL packet may be an EHT TB PPDU containing one or more data frames such as MPDUs. Each of the MPDUs may include a MAC header containing a QoS Control field, and may include a payload containing at least a portion of the UL data queued in the STA 420. The QoS Control field may indicate an updated UL queue size for the STA 420. In some implementations, the STA 420 may aggregate each of the MPDUs into a single A-MPDU contained in the UL packet.

In some implementations, the AP 410 may periodically increase the selected packet duration for a time period. In some other implementations, the AP 410 may repeat one or more of the above determinations for one or more additional UL packets (not shown in FIG. 4B for simplicity) and track the results over time. In this manner, the AP 410 may augment (or "refine," "enhance," or "modify") the queue depth that the STA 420 reported in the UL packet (from time $t_3$) based on the STA's historical UL performance discussed above.

Figure 5A:
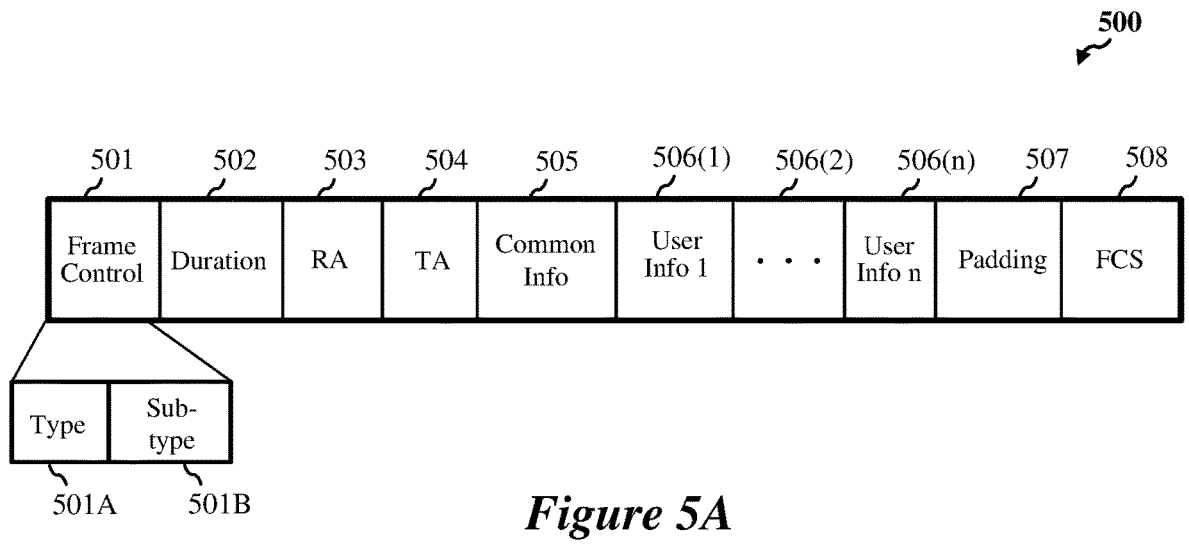
FIG. 5A shows an example trigger frame.

FIG. 5A shows an example trigger frame 500. The trigger frame 500 may be used as one or more of the trigger frames described with respect to FIGS. 4A and 4B. The trigger frame 500 is shown to contain a frame control field 501, a duration field 502, a receiver address (RA) field 503, a transmitter address (TA) field 504, a Common Info field 505, a number of User Info fields 506(1)-506(n), an optional Padding field 507, and a frame check sequence (FCS) field 508. In some implementations, the trigger frame 500 may be an UL OFDMA mode (RUs) trigger frame. In some other implementations, the trigger frame 500 may be an UL MU-MIMO mode (NSS) trigger frame.

The frame control field 501 contains a Type field 501A and a Sub-type field 501B. The Type field 501A may store a value to indicate that the trigger frame 500 is a control frame, and the Sub-type field 501B may store a value indicating a type of the trigger frame 500. The duration field 502 may store information indicating a duration or length of the trigger frame 500. The RA field 503 may store the address of a receiving device, such as the STA 420 of FIG. 4A or the STA 420 of FIG. 4B. The TA field 504 may store the address of a transmitting device, such as the AP 410 of FIG. 4A or the AP 410 of FIG. 4B. The Common Info field 505 may store information common to one or more receiving devices. Each of the User Info fields 506(1)-506(n) may store information for a particular receiving device containing, for example, the AID of the receiving device. The Padding field 507 may extend a length of the trigger frame 500, for example, to give a receiving device additional time to generate a response. The FCS field 508 may store a frame check sequence (such as for error detection).

In some implementations for which an AP solicits UL data transmissions from one or more STAs using the trigger frame 500, the selected duration of UL packets may be carried in the Common Info field 505 of the trigger frame 500 (such as in an UL length subfield of the Common Info field 505). In some other implementations for which the AP solicits UL data transmissions from one or more STAs using control information carried in a DL data transmission (rather than soliciting UL data transmissions using a trigger frame), the selected duration of UL packets may be carried in the control information of the DL data transmission. For example, when the AP solicits UL data transmissions from one or more STAs using triggered response scheduling (TRS) information carried in an A-Control subfield of the Control Information subfield of an HE variant Control field, the selected duration of UL packets may be carried in the UL Data Symbols subfield of the A-Control subfield.

In some implementations, the trigger frame 500 may allocate resources for and solicit one or more UL packet transmissions from a receiving device, such as the STA 420 of FIG. 4A or the STA 420 of FIG. 4B. For example, the duration field 502 may indicate an estimated time for a receiving device to transmit an UL packet. Additional parameters for the solicited UL packet may be indicated in one or more subfields (not shown) of the Common Info field 505. For example, when the UL packet is a HE TB PPDU, the additional parameters may include a value of a L-SIG Length field, a bandwidth in a HE-SIG-A, a guard interval (GI), a HE-LTF type, a LTF mode, a number of HE-LTF symbols, among other parameters. Additional parameters for the solicited UL packet may be indicated using one or more subfields of the User Info fields 506(1)-506(n). Example parameters include a code type (such as low-density parity-check, LDCP), a Modulation and Coding Scheme (MCS), a Dual Carrier Modulation (DCM), a number of spatial streams (SS), a number of contiguous RUs, and an expected receive signal power.

In some aspects, the trigger frame 500 may allocate dedicated RUs to associated STAs identified by AID values stored in corresponding ones of the User Info fields 506(1)-506(n). In other aspects, the trigger frame 500 may allocate random RUs to one or more groups of STAs using pre-defined AID values stored in the User Info fields 506(1)-506(n). For example, the AP may indicate a size (a number of bits) of the RUs, a location (a bandwidth) of the RUs, or a selected BSS to which random RUs are allocated. In some aspects, one or more subfields in the User Info fields 506(1)-506(n) may indicate parameters for MPDUs contained in an A-MPDU carried in an UL packet from a receiving device. Example parameters include a number of MPDUs that may be contained in the A-MPDU, a maximum number of traffic identifiers (TIDs) that may be aggregated in the A-MPDU, and a lowest QoS access category (AC).

Figure 5B:
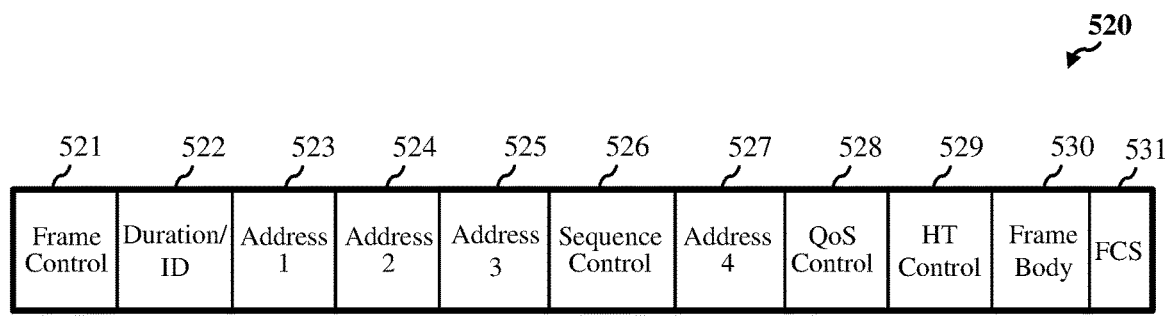
FIG. 5B shows an example media access control (MAC) protocol data unit (MPDU).

FIG. 5B shows an example medium access control (MAC) protocol data unit (MPDU) 520. The MPDU 520 may be used as one or more of the MPDUs described with respect to FIGS. 4A and 4B. The MPDU 520 also may be referred to herein as a PSDU, a MAC frame, or both. The MPDU 520 may be one of a number of data frames contained in a data field of an UL packet, such as a PPDU. In some implementations, the MPDU 520 may be contained in a data field of an UL packet (not shown). For example, a STA (such as one or more of the STAs of FIG. 1, the STA 200 of FIG. 2, the STA 420 of FIG. 4A, or the STA 420 of FIG. 4B), may transmit the UL packet to an AP (such as the AP 110 FIG. 1, the AP 300 of FIG. 3, the AP 410 of FIG. 4A, or the AP 410 of FIG. 4B), in response to a trigger frame, such as the trigger frame 500 of FIG. 5A.

The MPDU 520 is shown to contain a frame control field 521, a duration/ID field 522, an Address 1 field 523, an Address 2 field 524, an Address 3 field 525, a sequence control field 526, an address 4 field 527, a quality of service (QoS) control field 528, an HT control field 529, a frame body 530, and an FCS field 531. Fields 521-529 may be referred to herein as a MAC header of the MPDU 520.

The frame control field 521 may indicate certain parameters for the MPDU 520, such as a protocol version, a type, and a subtype. The duration/ID field 522 may indicate a duration value, an identifier (such as an AID), or both. The Address 1 field 523, the Address 2 field 524, the Address 3 field 525, and the Address 4 field 527 may contain individual or group addresses for all or a portion of the MPDU 520, such as a basic service set identifier (BSSID), a source address (SA), a destination address (DA), a transmitting STA address (TA), or a receiving STA address (RA). The sequence control field 526 may indicate a sequence number, a fragment number, or both, corresponding to the MPDU 520. The HT control field 529 may contain control information for the MPDU 520. The frame body 530 may contain information specific to a frame type, a subtype, or both, for the MPDU 520. The FCS field 531 may contain information for validating or interpreting all or a portion of the MPDU 520.

The QoS control field 528 may identify a traffic category (TC) or a traffic stream (TS) for the MPDU 520 as well as additional information related to, for example, QoS information, A-MPDU information, or mesh information for the MPDU 520. The information contained in the QoS control field 528 may vary based on a type or a subtype of the MPDU 520.

Figure 5C:
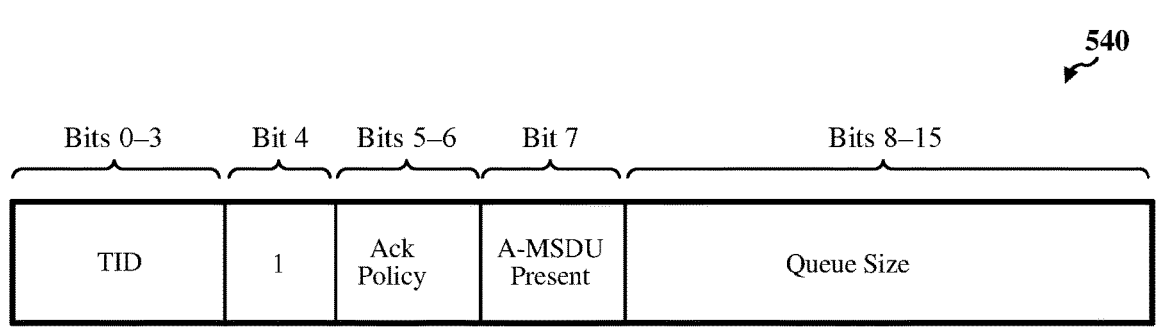
FIG. 5C shows an example Quality of Service (QoS) control field.

FIG. 5C shows an example Quality of Service (QoS) control field 540. The QoS control field 540 may be one implementation of the QoS control field 528 of the MPDU 520. In some implementations, the corresponding MPDU 520 may be a contention free (CF) acknowledgment frame. In some aspects, the MPDU 520 may be transmitted by a non-AP STA, such as the STA 420 of FIG. 4A or the STA 420 of FIG. 4B. In some implementations, the STA transmitting the corresponding MPDU 520 may not be operating in a non-mesh BSS as a buffer STA or a sleep STA according to certain power-save modes, such as Tunneled direct-link setup (TDLS) peer unscheduled automatic power save delivery (U-APSD) (TPU).

The QoS control field 540 is shown to contain five sub-fields (over 16 bits). In some implementations, bits 0-3 may be a TID subfield that identifies a traffic category (TC) or a traffic stream (TS) to which all or a portion of the MSDU or A-MSDU of the corresponding MPDU 520 belongs. In some implementations, bit 4 may be set to 1. In some implementations, bits 5-6 may be an Ack Policy subfield that indicates an acknowledgement policy to be followed upon delivery of the corresponding MPDU 520. In some implementations, bit 7 may be an "A-MSDU Present" subfield indicating the presence of an A-MSDU. For example, if the MPDU 520 is contained in an A-MSDU, bit 7 may be set to 1.

Finally, bits 8-15 may be a queue size subfield indicating an amount of buffered traffic that the STA has for a given TC or TS. An AP that receives the MPDU 520 may use information contained in the queue size subfield (bits 8-15) to determine a transmission opportunity (TXOP) duration assigned to the STA. In some aspects, the queue size subfield may be for UL single-user (SU) and UL OFDMA transmissions. In some implementations, a value in the queue size subfield may represent a total size (in bytes) that the STA has buffered (in a delivery queue) for (all or a portion of) MSDUs and A-MSDUs with TID values equal to the corresponding TID. As mentioned above, the STA may indicate an updated UL queue size for the STA in the queue size subfield. In some implementations, the corresponding TID value may be indicated in the TID subfield (bits 0-3) of the QoS control field 540. In some aspects, the total size may be rounded up to the nearest multiple of a number of octets (such as 256) and expressed in units of the number of octets. In some aspects, the total size may include the MSDU or A-MSDU of the corresponding QoS control field 540, the corresponding MPDU 520, or both. In some other aspects, the total size may exclude the MSDU or A-MSDU of the corresponding QoS control field 540, the corresponding MPDU 520, or both.

Figure 6:
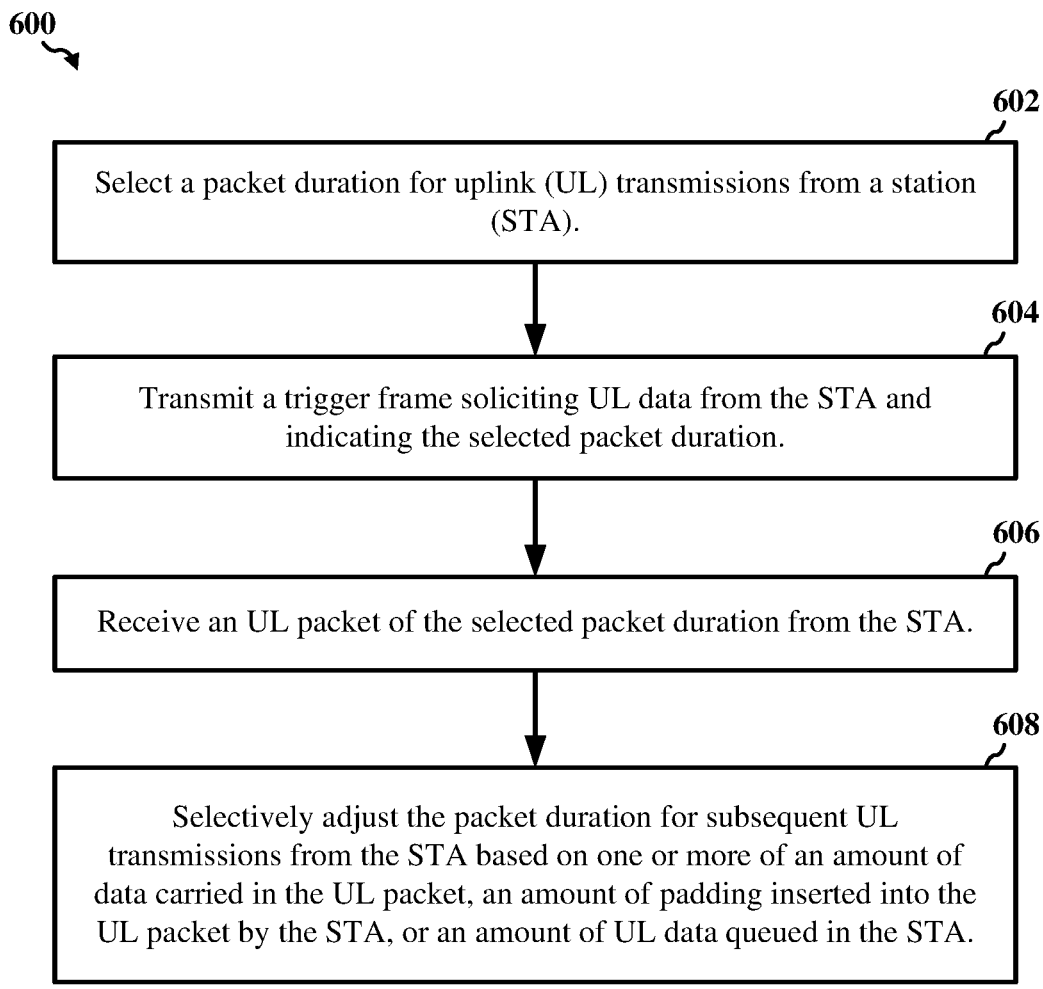
FIG. 6 shows an illustrative flow chart depicting an example operation for wireless communications that supports adjusting a duration of uplink (UL) packets.

FIG. 6 shows an illustrative flow chart depicting an example operation 600 for wireless communications that supports adjusting packet durations. The operation 600 may be performed by a wireless communication device such as an access point (AP) or an apparatus of an AP. In some implementations, the operation 600 may be performed by the AP 110 of FIG. 1 or the AP 300 of FIGS. 3, 4A, and 4B. In some other implementations, the operation 600 may be performed by another suitable AP. At block 602, the AP selects a packet duration for uplink (UL) transmissions from a STA. At block 604, the AP transmits a trigger frame soliciting UL data from the STA and indicating the selected packet duration. At block 606, the AP receives an UL packet of the selected packet duration from the STA. At block 608, the AP selectively adjusts the packet duration for subsequent UL transmissions from the STA based on one or more of an amount of data carried in the UL packet, an amount of padding inserted into the UL packet by the STA, or an amount of UL data queued in the STA.

In some implementations, the AP may estimate the amount of queued UL data in the STA based on information contained in a QoS control field of one or more UL packets previously received from the STA. In some other implementations, the AP may estimate the amount of queued UL data in the STA based on a BSR provided by the STA (such as in response to a BSR Poll (BSRP) frame). In some instances, the UL packet may be an HE TB PPDU. In some other instances, the UL packet may be an EHT TB PPDU. In some other instances, the UL packet may include at least one MPDU.

In some implementations, the UL packet may include an indication of the amount of UL data queued in the STA. In some instances, the indication may be carried in a Quality-of-Service (QoS) Control field of the UL packet. In some other instances, the indication may be carried in one or more fields of any suitable frame or packet transmitted to the AP.

Figure 7A:
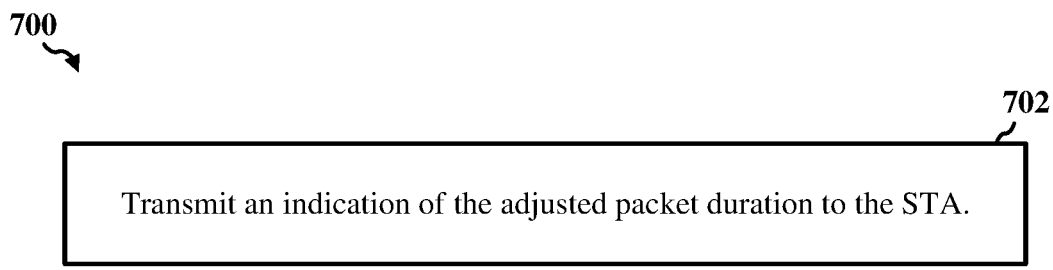
FIG. 7A shows an illustrative flow chart depicting another example operation for wireless communications that supports adjusting the duration of UL packets.

FIG. 7A shows an illustrative flow chart depicting another example operation 700 for wireless communications that supports adjusting packet durations. The operation 700 may be performed by a wireless communication device such as an access point (AP) or an apparatus of an AP. In some implementations, the operation 700 may be performed by the AP 110 of FIG. 1 or the AP 300 of FIGS. 3, 4A, and 4B. In some other implementations, the operation 700 may be performed by another suitable AP. In some implementations, the operation 700 may be performed after the AP selectively adjusts the packet duration in block 608 of FIG. 6. At block 702, the AP transmits an indication of the adjusted packet duration to the STA. In some instances, the indication of the adjusted packet duration may be transmitted to the STA in one or more subsequent trigger frames. In some other instances, the indication of the adjusted packet duration may be transmitted to the STA in another suitable action frame, management frame, or control frame.

FIG. 7B shows an illustrative flow chart depicting another example operation 710 for wireless communications that supports adjusting packet durations. The operation 710 may be performed by a wireless communication device such as an AP or an apparatus of an AP. In some implementations, the operation 710 may be performed by the AP 110 of FIG. 1 or the AP 300 of FIGS. 3, 4A, and 4B. In some other implementations, the operation 710 may be performed by another suitable AP. In some implementations, the operation 710 may be performed after the AP selectively adjusts the packet duration in block 608 of FIG. 6. In some other implementations, the operation 710 may be performed before or after (or at the same or similar time) the AP transmits the indication of the adjusted packet duration in block 702 of FIG. 7A. At block 712, the AP periodically increases the selected packet duration for a time period.

FIG. 7C shows an illustrative flow chart depicting another example operation 720 for wireless communications that supports adjusting packet durations. The operation 720 may be performed by a wireless communication device such as an AP or an apparatus of an AP. In some implementations, the operation 720 may be performed by the AP 110 of FIG. 1 or the AP 300 of FIGS. 3, 4A, and 4B. In some other implementations, the operation 720 may be performed by another suitable AP. In some implementations, the operation 720 may be performed after the AP selectively adjusts the packet duration in block 608 of FIG. 6. In some other implementations, the operation 720 may be performed before or after (or at the same or similar time) the AP transmits the indication of the adjusted packet duration in block 702 of FIG. 7A. In yet some other implementations, the operation 720 may be performed before or after (or at the same or similar time) the AP periodically increases the selected packet duration in block 712 of FIG. 7B. At block 722, the AP determines a weighted moving average of the estimated maximum amount of data that the STA is able to include in a given packet. At block 724, the AP selects a minimum amount of data that the STA is to include in each UL packet based on the determined weighted moving average. At block 726, the AP transmits an indication of the selected minimum amount of data to the STA.

FIG. 8A shows an illustrative flow chart depicting another example operation 800 for wireless communications that supports adjusting packet durations. The operation 800 may be performed by a wireless communication device such as an AP or an apparatus of an AP. In some implementations, the operation 800 may be performed by the AP 110 of FIG. 1 or the AP 300 of FIGS. 3, 4A, and 4B. In some other implementations, the operation 800 may be performed by another suitable AP. In some implementations, the operation 800 may be one example of selectively adjusting the packet duration in block 608 of FIG. 6. In some implementations, the operation 800 may be performed before or after the AP transmits the indication of the adjusted packet duration in block 702 of FIG. 7A. In some other implementations, the operation 800 may be performed before or after the AP periodically increases the selected packet duration in block 712 of FIG. 7B. In yet some other implementations, the operation 800 may be performed before or after (or at the same or similar time as) the operation 720 FIG. 7C. At block 802, the AP decreases the packet duration when the amount of padding inserted into the UL packet by the STA is greater than a value (such as a threshold value selected or configured by the AP 410) while at least some UL data is queued in the STA.

FIG. 8B shows an illustrative flow chart depicting another example operation 810 for wireless communications that supports adjusting packet durations. The operation 810 may be performed by a wireless communication device such as an AP or an apparatus of an AP. In some implementations, the operation 810 may be performed by the AP 110 of FIG. 1 or the AP 300 of FIGS. 3, 4A, and 4B. In some other implementations, the operation 810 may be performed by another suitable AP. In some implementations, the operation 810 may be one example of selectively adjusting the packet duration in block 608 of FIG. 6. In some implementations, the operation 810 may be performed before or after the AP transmits the indication of the adjusted packet duration in block 702 of FIG. 7A. In some other implementations, the operation 810 may be performed before or after the AP periodically increases the selected packet duration in block 712 of FIG. 7B. In yet some other implementations, the operation 810 may be performed before or after (or at the same or similar time) the operation 720 FIG. 7C. At block 812, the AP decreases the packet duration when a size or duration of one or more aggregated frames carried in the UL packet is less than a value (such as a threshold value selected or configured by the AP 410).

FIG. 8C shows an illustrative flow chart depicting another example operation 820 for wireless communications that supports adjusting packet durations. The operation 820 may be performed by a wireless communication device such as an AP or an apparatus of an AP. In some implementations, the operation 820 may be performed by the AP 110 of FIG. 1 or the AP 300 of FIGS. 3, 4A, and 4B. In some other implementations, the operation 820 may be performed by another suitable AP. In some implementations, the operation 820 may be one example of selectively adjusting the packet duration in block 608 of FIG. 6. In some implementations, the operation 820 may be performed before or after the AP transmits the indication of the adjusted packet duration in block 702 of FIG. 7A. In some other implementations, the operation 820 may be performed before or after the AP periodically increases the selected packet duration in block 712 of FIG. 7B. In yet some other implementations, the operation 820 may be performed before or after (or at the same or similar time) the operation 720 FIG. 7C. At block 822, the AP decreases the packet duration when the amount of data carried in the UL packet is less than the amount of UL data queued in the STA and at least a portion of one or more data fields contained in the UL packet do not carry queued UL data from the STA.

Figure 8D:
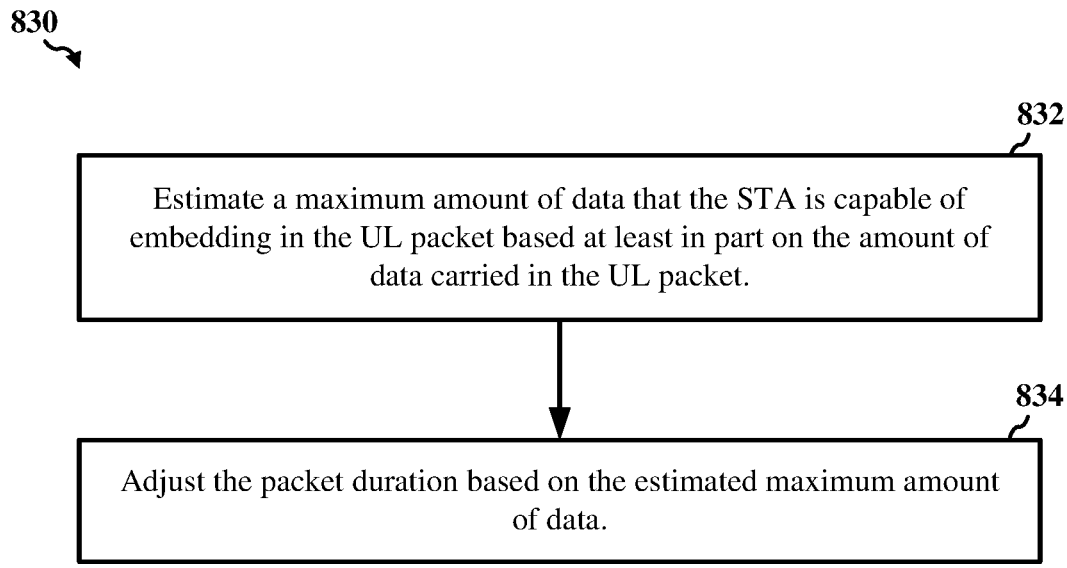
FIG. 8D shows an illustrative flow chart depicting another example operation for wireless communications that supports adjusting the duration of UL packets.

FIG. 8D shows an illustrative flow chart depicting another example operation 830 for wireless communications that supports adjusting packet durations. The operation 830 may be performed by a wireless communication device such as an AP or an apparatus of an AP. In some implementations, the operation 830 may be performed by the AP 110 of FIG. 1 or the AP 300 of FIGS. 3, 4A, and 4B. In some other implementations, the operation 830 may be performed by another suitable AP. In some implementations, the operation 830 may be one example of selectively adjusting the packet duration in block 608 of FIG. 6. In some implementations, the operation 830 may be performed before or after the AP transmits the indication of the adjusted packet duration in block 702 of FIG. 7A. In some other implementations, the operation 830 may be performed before or after the AP periodically increases the selected packet duration in block 712 of FIG. 7B. In yet some other implementations, the operation 830 may be performed before or after (or at the same or similar time) the operation 720 FIG. 7C. At block 832, the AP estimates a maximum amount of data that the STA is capable of embedding in the UL packet based at least in part on the amount of data carried in the UL packet. At block 834, the AP adjusts the packet duration based on the estimated maximum amount of data.

Figure 8E:
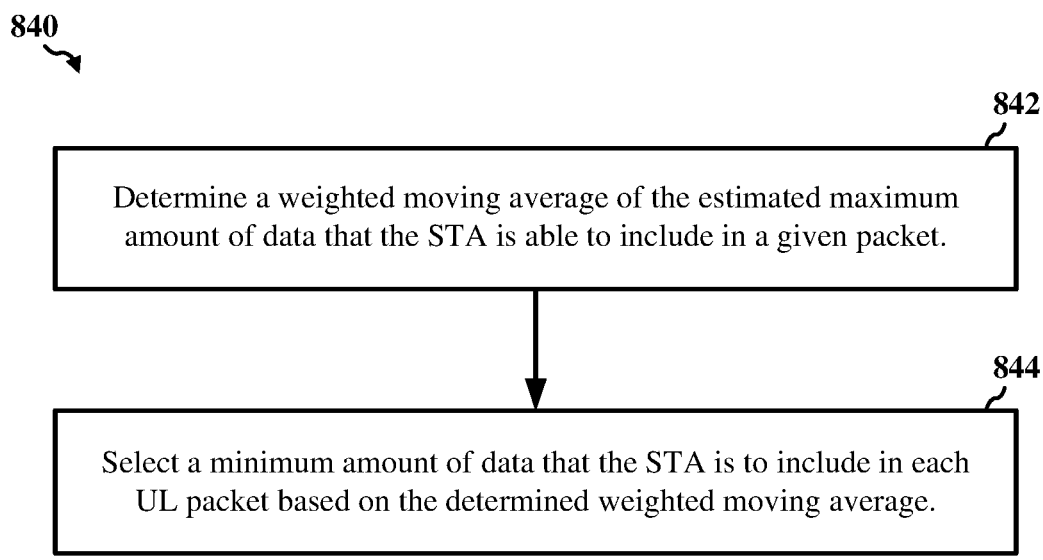
FIG. 8E shows an illustrative flow chart depicting another example operation for wireless communications that supports adjusting the duration of UL packets.

FIG. 8E shows an illustrative flow chart depicting another example operation 840 for wireless communications that supports adjusting packet durations. The operation 840 may be performed by a wireless communication device such as an AP or an apparatus of an AP. In some implementations, the operation 840 may be performed by the AP 110 of FIG. 1 or the AP 300 of FIGS. 3, 4A, and 4B. In some other implementations, the operation 840 may be performed by another suitable AP. In some implementations, the operation 840 may be performed after estimating a maximum amount of data that the STA is capable of embedding in block 834 of FIG. 8D. At block 842, the AP determines a weighted moving average of the estimated maximum amount of data that the STA is able to include in a given packet. At block 844, the AP selects a minimum amount of data that the STA is to include in each UL packet based on the determined weighted moving average. In this way, the AP may select an amount of queued UL data that the STA is capable of inserting into UL packets.

Figure 9:
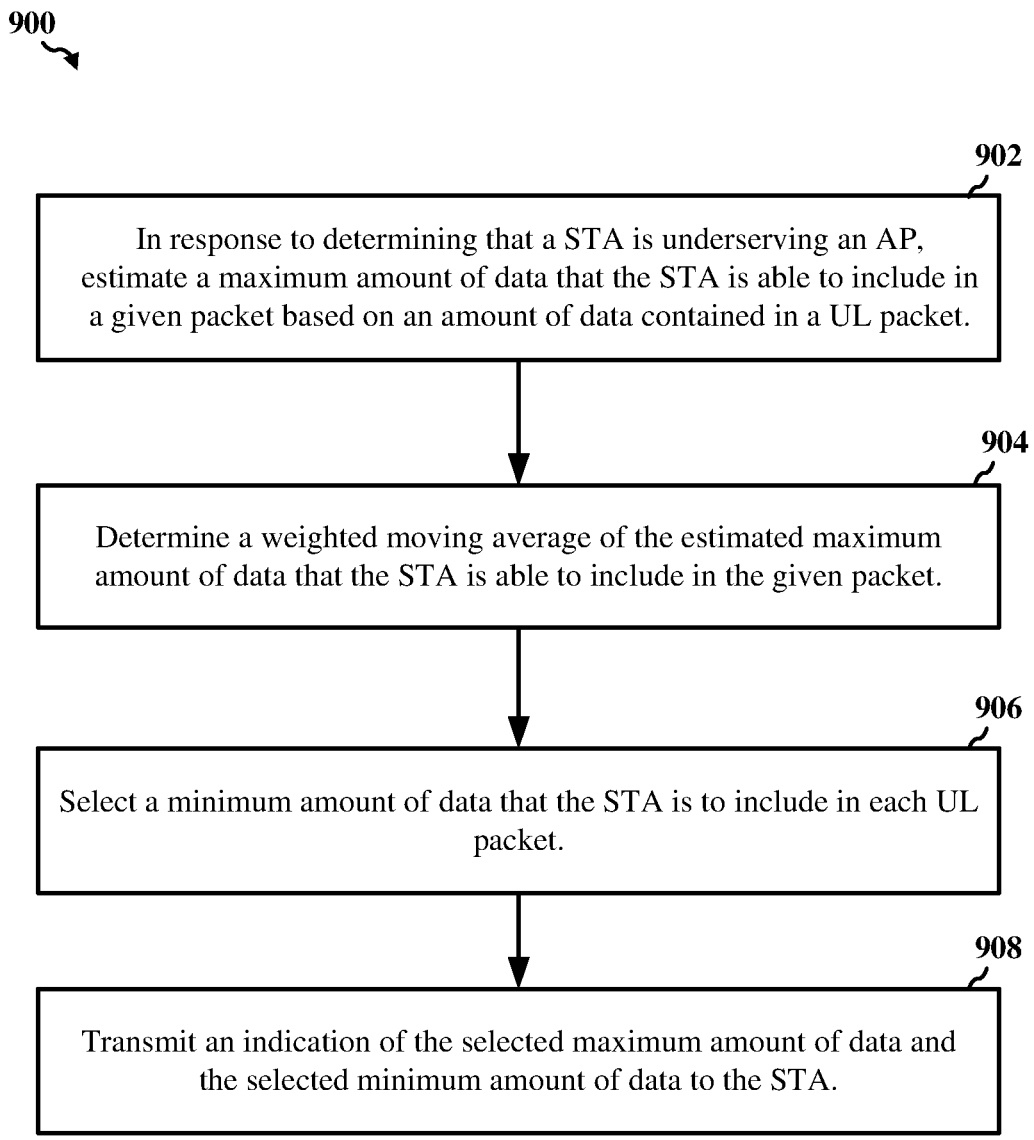
FIG. 9 shows an illustrative flow chart depicting another example operation for wireless communications that supports adjusting the duration of UL packets.

FIG. 9 shows an illustrative flow chart depicting an example operation 900 for wireless communications that supports adjusting packet durations. The example operation 900 may be performed by a wireless communication device such as an access point (AP) or an apparatus of an AP. In some implementations, the operation 900 may be performed by the AP 110 of FIG. 1 or the AP 300 of FIGS. 3, 4A, and 4B. In some other implementations, the operation 900 may be performed by another suitable AP. In some implementations, the operation 900 may be performed after determining that the STA is underserving the AP. At block 902, the AP estimates a maximum amount of data that the STA is able to include in a given packet based on an amount of data contained in the UL packet. At block 904, the AP determines a weighted moving average of the estimated maximum amount of data that the STA is able to include in the given packet. At block 906, the AP selects a minimum amount of data that the STA is to include in each UL packet. At block

908, the AP transmits an indication of the selected maximum amount of data and the selected minimum amount of data to the STA.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication by an access point (AP), comprising:
   transmitting a trigger frame indicating, to a station (STA), a selected packet duration for uplink (UL) transmissions from the STA to the AP;
   receiving an UL packet of the selected packet duration from the STA; and selectively adjusting the packet duration for subsequent reception of UL transmissions from the STA based at least in part on an amount of padding inserted by the STA into the UL packet or an indication of UL data queued in the STA, wherein selectively adjusting the packet duration includes decreasing the packet duration responsive to the amount of padding inserted by the STA into the UL packet.

2. The method of claim 1, wherein the packet duration is decreased responsive to the amount of padding inserted by the STA into the UL packet being greater than a first value while at least some UL data is queued in the STA.

3. The method of claim 1, wherein selectively adjusting the packet duration includes:
increasing the packet duration responsive to the amount of padding inserted by the STA into the UL packet being less than a first value while the at least some UL data is queued in the STA.

4. The method of claim 1, further comprising:
indicating the adjusted packet duration to the STA in a subsequent trigger frame.

5. The method of claim 4, wherein the indication of the adjusted packet duration is carried in a Common Info field of the subsequent trigger frame.

6. The method of claim 1, wherein the UL packet comprises a trigger-based (TB) physical layer convergence procedure (PLCP) protocol data unit (PPDU) carrying a plurality of aggregated medium access control (MAC) protocol data units (A-MPDUs).

7. The method of claim 6, wherein selectively adjusting the packet duration further includes:
decreasing the packet duration responsive to one or more of a size, a length, or a number of the A-MPDUs carried in the UL packet being less than a respective value.

8. The method of claim 1, wherein the UL packet indicates the amount of UL data queued in the STA.

9. The method of claim 8, wherein the amount of UL data queued in the STA is indicated in a Quality-of-Service (QoS) control field or a buffer status report (BSR) of the UL packet.

10. The method of claim 1, wherein selectively adjusting the packet duration further includes:
decreasing the packet duration responsive to an amount of data carried in the UL packet being less than the amount of UL data queued in the STA.

11. The method of claim 1, wherein selectively adjusting the packet duration is further based on a number of STAs triggered for UL transmissions by the trigger frame.

12. An access point (AP), comprising:
one or more memories;
one or more processors coupled to the one or more memories, the one or more processors individually or collectively configured to cause the AP to:
transmit a trigger frame indicating, to a station (STA), a selected packet duration for uplink (UL) transmissions from the STA to the AP;
receive an UL packet of the selected packet duration from the STA; and
selectively adjust the packet duration for subsequent reception of UL transmissions from the STA based at least in part on an amount of padding inserted by the STA into the UL packet or an indication of UL data queued in the STA, wherein execution of the instructions to selectively adjust the packet duration causes the AP to decrease the packet duration responsive to the amount of padding inserted by the STA into the UL packet.

13. The AP of claim 12, wherein the packet duration is decreased responsive to the amount of padding inserted by the STA into the UL packet being greater than a first value while at least some UL data is queued in the STA.

14. The AP of claim 12, wherein execution of the instructions is further configured to adjust the packet duration by causing the AP to:
increase the packet duration responsive to the amount of padding inserted by the STA into the UL packet being less than a first value while the at least some UL data is queued in the STA.

15. The AP of claim 12, wherein execution of the instructions is further configured to cause the AP to:
indicate the adjusted packet duration to the STA in a subsequent trigger frame.

16. The AP of claim 15, wherein the indication of the adjusted packet duration is carried in a Common Info field of the subsequent trigger frame.

17. The AP of claim 12, wherein the UL packet comprises a trigger-based (TB) physical layer convergence procedure (PLCP) protocol data unit (PPDU) carrying a plurality of aggregated medium access control (MAC) protocol data units (A-MPDUs).

18. The AP of claim 17, wherein execution of the instructions is further configured to adjust the packet duration by causing the AP to:
decrease the packet duration responsive to one or more of a size, a length, or a number of the A-MPDUs carried in the UL packet being less than a respective value.

19. The AP of claim 12, wherein the amount of UL data queued in the STA is indicated in a Quality-of-Service (QoS) control field or a buffer status report (BSR) of the UL packet.

20. The AP of claim 12, wherein execution of the instructions is further configured to adjust the packet duration by causing the AP to:
decrease the packet duration responsive to an amount of data carried in the UL packet being less than the amount of UL data queued in the STA.

21. The AP of claim 12, wherein selectively adjusting the packet duration is further based on a number of STAs triggered for UL transmissions by the trigger frame.

* * * * *